US010635684B2

(12) United States Patent
Beausoleil et al.

(10) Patent No.: US 10,635,684 B2
(45) Date of Patent: *Apr. 28, 2020

(54) SHARED FOLDER BACKED INTEGRATED WORKSPACES

(71) Applicant: DROPBOX, INC., San Francisco, CA (US)

(72) Inventors: Sean Beausoleil, Mountain View, CA (US); Matteus Pan, San Francisco, CA (US); Jean-Denis Greze, San Francisco, CA (US); Anthony DeVincenzi, San Francisco, CA (US); Maxwell Johnson, San Francisco, CA (US); Jack Dubie, Menlo Park, CA (US); Colin Dunn, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/624,615

(22) Filed: Jun. 15, 2017

(65) Prior Publication Data
US 2017/0285928 A1    Oct. 5, 2017

Related U.S. Application Data

(63) Continuation of application No. 14/726,030, filed on May 29, 2015, now Pat. No. 9,715,534.
(Continued)

(51) Int. Cl.
G06F 3/048       (2013.01)
G06F 16/248      (2019.01)
(Continued)

(52) U.S. Cl.
CPC .......... G06F 16/248 (2019.01); G06F 3/0481 (2013.01); G06F 3/0484 (2013.01);
(Continued)

(58) Field of Classification Search
CPC ...... G06Q 10/107; G06Q 10/10; H04L 51/04; H04L 51/08; H04L 67/306; H04L 41/22;
(Continued)

(56) References Cited

U.S. PATENT DOCUMENTS 5,634,129 A    5/1997  Dickinson
6,370,567 B1   4/2002  Ouchi
(Continued)

FOREIGN PATENT DOCUMENTS

AU    2016235983    9/2016
AU    2016235984    9/2016
(Continued)

OTHER PUBLICATIONS

WikiHow, "How to Use Facebook", 2013, retrieved from http://www.wikihow.com/Use-Facebook.
(Continued)

Primary Examiner — Linh K Pham
(74) Attorney, Agent, or Firm — DLA Piper LLP (US)

(57) ABSTRACT

Disclosed are systems, methods, and non-transitory computer-readable storage media for shared folder backed integrated workspaces. In some implementations, a content management system can provide a graphical user interface (GUI) that integrates communications and content management into a single user interface. The user interface can include mechanisms that allow a user to provide input to generate a new workspace. The user interface can provide a mechanism to allow a user to view conversations related to the workspace and/or content items associated with the workspace. The user interface can present representations of content items associated with the workspace and allow the user to provide input to generate, view, edit, and share content items associated with the workspace.

21 Claims, 17 Drawing Sheets

Related U.S. Application Data

(60) Provisional application No. 62/136,871, filed on Mar. 23, 2015.

(51) Int. Cl.

| | | |
|---|---|---|
| G06F 3/0484 | (2013.01) | |
| G06F 3/0481 | (2013.01) | |
| G06Q 10/10 | (2012.01) | |
| G06F 16/16 | (2019.01) | |
| G06F 16/178 | (2019.01) | |
| G06F 16/25 | (2019.01) | |
| G06F 16/28 | (2019.01) | |
| G06F 16/958 | (2019.01) | |
| G06F 16/957 | (2019.01) | |
| H04L 12/18 | (2006.01) | |
| H04L 12/58 | (2006.01) | |
| G06F 17/22 | (2006.01) | |
| H04L 29/06 | (2006.01) | |
| H04L 12/24 | (2006.01) | |
| H04L 29/08 | (2006.01) | |
| G06F 17/24 | (2006.01) | |
| G06F 16/9535 | (2019.01) | |

(52) U.S. Cl.
CPC ...... *G06F 3/04817* (2013.01); *G06F 3/04842* (2013.01); *G06F 3/04847* (2013.01); *G06F 16/168* (2019.01); *G06F 16/178* (2019.01); *G06F 16/252* (2019.01); *G06F 16/285* (2019.01); *G06F 16/958* (2019.01); *G06F 16/9535* (2019.01); *G06F 16/9574* (2019.01); *G06F 17/2205* (2013.01); *G06F 17/2235* (2013.01); *G06F 17/24* (2013.01); *G06F 17/248* (2013.01); *G06Q 10/10* (2013.01); *G06Q 10/107* (2013.01); *H04L 12/1822* (2013.01); *H04L 12/1827* (2013.01); *H04L 41/22* (2013.01); *H04L 51/046* (2013.01); *H04L 51/08* (2013.01); *H04L 51/16* (2013.01); *H04L 51/22* (2013.01); *H04L 51/28* (2013.01); *H04L 51/32* (2013.01); *H04L 51/36* (2013.01); *H04L 63/08* (2013.01); *H04L 63/10* (2013.01); *H04L 63/108* (2013.01); *H04L 67/1097* (2013.01); *H04L 67/306* (2013.01); *G06F 2203/04803* (2013.01); *H04L 51/10* (2013.01); *H04L 51/24* (2013.01)

(58) Field of Classification Search
CPC ......... H04L 51/16; H04L 51/24; H04L 51/32; H04L 51/36; G06F 17/30165; G06F 16/168; G06F 3/04842
See application file for complete search history.

(56) References Cited

U.S. PATENT DOCUMENTS

| | | |
|---|---|---|
| 6,505,236 B1 | 1/2003 | Pollack |
| 6,839,741 B1 | 1/2005 | Tsai |
| 6,970,906 B1 | 11/2005 | Parsons et al. |
| 7,039,678 B1 | 5/2006 | Halahmi et al. |
| 7,543,237 B2 | 6/2009 | Kontny et al. |
| 7,689,510 B2 | 3/2010 | Lamkin et al. |
| 7,693,958 B2 | 4/2010 | Teodosiu et al. |
| 7,774,710 B2 | 8/2010 | Krishnan et al. |
| 7,865,394 B1 | 1/2011 | Calloway et al. |
| 8,015,491 B2 | 9/2011 | Shaver et al. |
| 8,117,271 B2 | 2/2012 | McConn et al. |
| 8,122,015 B2 | 2/2012 | Spring |
| 8,122,051 B2 | 2/2012 | Spring et al. |
| 8,161,120 B2 | 4/2012 | Tan |
| 8,214,747 B1 | 7/2012 | Yankovich et al. |
| 8,245,141 B1 | 8/2012 | Fuller et al. |
| 8,250,150 B2 | 8/2012 | Beck et al. |
| 8,316,128 B2 | 11/2012 | Beck et al. |
| 8,341,532 B2 | 12/2012 | Ryan et al. |
| 8,438,185 B2 | 5/2013 | Teranishi et al. |
| 8,533,268 B1 | 9/2013 | Vernon et al. |
| 8,543,926 B2 | 9/2013 | Giles |
| 8,700,719 B1 | 4/2014 | Covitz et al. |
| 8,713,106 B2 | 4/2014 | Spataro et al. |
| 8,745,222 B2 | 6/2014 | Chi et al. |
| 8,793,324 B1 | 7/2014 | Schabes et al. |
| 8,892,679 B1 | 11/2014 | Destagnol et al. |
| 8,930,412 B2 | 1/2015 | Nelson |
| 8,977,722 B2 | 3/2015 | Tsao |
| 8,990,151 B2 | 3/2015 | Savage |
| 9,002,962 B2 | 4/2015 | Lynch et al. |
| 9,166,954 B2 | 10/2015 | Swineford et al. |
| 9,235,268 B2 | 1/2016 | Arrasvuori et al. |
| 9,240,962 B2 | 1/2016 | Jung |
| 9,251,360 B2 | 2/2016 | Meyer et al. |
| 9,252,973 B1* | 2/2016 | Lin ................. H04L 51/066 |
| 9,298,355 B1 | 3/2016 | Beausoleil et al. |
| 9,300,609 B1 | 3/2016 | Beausoleil et al. |
| 9,395,892 B1 | 7/2016 | Beausoleil et al. |
| 9,395,893 B1 | 7/2016 | Beausoleil et al. |
| 9,542,391 B1 | 1/2017 | Eisner et al. |
| 9,641,488 B2 | 5/2017 | Mityagin et al. |
| 9,978,040 B2 | 5/2018 | Lee et al. |
| 2002/0120485 A1 | 8/2002 | Kirkconnell-Ewing et al. |
| 2002/0138582 A1 | 9/2002 | Chandra et al. |
| 2003/0046134 A1 | 3/2003 | Frolick et al. |
| 2003/0131062 A1 | 7/2003 | Miyashita |
| 2003/0135565 A1 | 7/2003 | Estrada |
| 2004/0117445 A9 | 6/2004 | Lee |
| 2004/0162878 A1 | 8/2004 | Lewis |
| 2004/0187140 A1 | 9/2004 | Aigner et al. |
| 2004/0225647 A1 | 11/2004 | Connelly et al. |
| 2005/0028008 A1 | 2/2005 | Kumar |
| 2005/0091289 A1 | 4/2005 | Shappell et al. |
| 2005/0097440 A1 | 5/2005 | Lusk et al. |
| 2005/0108293 A1 | 5/2005 | Lipman et al. |
| 2005/0182773 A1 | 8/2005 | Feinsmith |
| 2005/0198125 A1 | 9/2005 | Macleod |
| 2005/0198299 A1 | 9/2005 | Beck |
| 2005/0022931 A1 | 10/2005 | Mamou et al. |
| 2005/0222931 A1 | 10/2005 | Mamou et al. |
| 2005/0223315 A1 | 10/2005 | Shimizu et al. |
| 2006/0020904 A1 | 1/2006 | Aaltonen et al. |
| 2006/0080432 A1 | 4/2006 | Spataro et al. |
| 2006/0101443 A1 | 5/2006 | Nasr |
| 2006/0136821 A1 | 6/2006 | Barabe et al. |
| 2007/0033088 A1 | 2/2007 | Aigner et al. |
| 2007/0050324 A1 | 3/2007 | Trinkel et al. |
| 2007/0067726 A1 | 3/2007 | Flynt et al. |
| 2007/0100829 A1 | 5/2007 | Allen et al. |
| 2007/0150551 A1 | 6/2007 | Krishnan et al. |
| 2007/0276795 A1 | 11/2007 | Poulsen |
| 2007/0277098 A1 | 11/2007 | Shahar et al. |
| 2007/0288839 A1 | 12/2007 | Kurosawa |
| 2008/0028323 A1 | 1/2008 | Rosen et al. |
| 2008/0036794 A1 | 2/2008 | Weiser et al. |
| 2008/0077614 A1 | 3/2008 | Roy |
| 2008/0091761 A1 | 4/2008 | Tsao |
| 2008/0120382 A1 | 5/2008 | Heidloff et al. |
| 2008/0140732 A1 | 6/2008 | Wilson et al. |
| 2008/0177994 A1 | 7/2008 | Mayer |
| 2008/0195659 A1 | 8/2008 | Rawle |
| 2008/0201422 A1 | 8/2008 | Peccora et al. |
| 2008/0256458 A1 | 10/2008 | Aldred et al. |
| 2008/0288453 A1 | 11/2008 | Smetters et al. |
| 2009/0013043 A1 | 1/2009 | Tan |
| 2009/0064284 A1 | 3/2009 | Poston et al. |
| 2009/0131116 A1 | 5/2009 | Tsuchiya |
| 2009/0138808 A1 | 5/2009 | Moromisato et al. |
| 2009/0177754 A1 | 7/2009 | Brezina et al. |
| 2009/0235182 A1 | 9/2009 | Kagawa et al. |
| 2009/0249244 A1 | 10/2009 | Robinson |
| 2009/0282421 A1 | 11/2009 | Jaffer et al. |
| 2009/0307605 A1 | 12/2009 | Yoon |

(56) References Cited

U.S. PATENT DOCUMENTS

| | | |
|---|---|---|
| 2010/0024011 A1 | 1/2010 | Fukuoka |
| 2010/0082713 A1 | 4/2010 | Frid-Nielsen et al. |
| 2010/0095198 A1 | 4/2010 | Bultrowicz et al. |
| 2010/0138503 A1 | 6/2010 | Ishikawa et al. |
| 2010/0151431 A1 | 6/2010 | Miller |
| 2010/0180196 A1 | 7/2010 | Matsusaka |
| 2010/0211621 A1 | 8/2010 | Hariharan et al. |
| 2010/0241711 A1 | 9/2010 | Ansari et al. |
| 2010/0262435 A1 | 10/2010 | Smith |
| 2010/0287221 A1 | 11/2010 | Battepati et al. |
| 2010/0299763 A1 | 11/2010 | Marcus et al. |
| 2011/0014524 A1 | 1/2011 | Skotheim et al. |
| 2011/0022662 A1 | 1/2011 | Barber-Mingo et al. |
| 2011/0069643 A1* | 3/2011 | Yoakum .............. H04L 65/4015 370/261 |
| 2011/0119353 A1 | 5/2011 | Tsao |
| 2011/0145245 A1 | 6/2011 | Choi |
| 2011/0202430 A1 | 8/2011 | Narayanan et al. |
| 2011/0214088 A1 | 9/2011 | Sandru |
| 2011/0249024 A1 | 10/2011 | Arrasvuori |
| 2011/0258554 A1 | 10/2011 | Sidenur et al. |
| 2012/0079389 A1 | 3/2012 | Tsao |
| 2012/0089610 A1 | 4/2012 | Agrawal et al. |
| 2012/0124092 A1 | 5/2012 | Teranishi et al. |
| 2012/0143917 A1 | 6/2012 | Prabaker et al. |
| 2012/0151379 A1 | 6/2012 | Schultz et al. |
| 2012/0182384 A1 | 7/2012 | Anderson et al. |
| 2012/0192086 A1 | 7/2012 | Ghods et al. |
| 2012/0221520 A1 | 8/2012 | Garrett et al. |
| 2012/0284290 A1 | 11/2012 | McCausland |
| 2012/0290531 A1 | 11/2012 | Kallakuri et al. |
| 2012/0311060 A1* | 12/2012 | Beck .................... G06Q 10/107 709/206 |
| 2012/0317239 A1 | 12/2012 | Mulder et al. |
| 2012/0331108 A1 | 12/2012 | Ferdowsi |
| 2013/0013560 A1 | 1/2013 | Goldberg et al. |
| 2013/0014023 A1* | 1/2013 | Lee ..................... G06Q 10/103 715/751 |
| 2013/0024788 A1* | 1/2013 | Olsen .................... G06Q 10/10 715/753 |
| 2013/0073971 A1 | 3/2013 | Huang |
| 2013/0080919 A1 | 3/2013 | Kiang et al. |
| 2013/0117376 A1 | 5/2013 | Filman et al. |
| 2013/0124638 A1 | 5/2013 | Barreto et al. |
| 2013/0138608 A1 | 5/2013 | Smith |
| 2013/0138723 A1 | 5/2013 | Ku et al. |
| 2013/0173798 A1 | 7/2013 | Micucci et al. |
| 2013/0179799 A1 | 7/2013 | Savage |
| 2013/0191339 A1 | 7/2013 | Von Haden et al. |
| 2013/0198600 A1 | 8/2013 | Lockhart et al. |
| 2013/0212112 A1 | 8/2013 | Blom et al. |
| 2013/0218829 A1 | 8/2013 | Martinez |
| 2013/0227015 A1 | 8/2013 | Mihara et al. |
| 2013/0246901 A1 | 9/2013 | Massand |
| 2013/0254699 A1 | 9/2013 | Bashir et al. |
| 2013/0275509 A1 | 10/2013 | Micucci et al. |
| 2013/0297317 A1 | 11/2013 | Lee et al. |
| 2013/0305165 A1 | 11/2013 | Zuber |
| 2013/0311557 A1 | 11/2013 | Motes |
| 2014/0012836 A1 | 1/2014 | Bercovici |
| 2014/0013246 A1 | 1/2014 | Beechuk et al. |
| 2014/0029751 A1 | 1/2014 | Swineford et al. |
| 2014/0047560 A1 | 2/2014 | Meyer et al. |
| 2014/0068401 A1 | 3/2014 | Kirigin |
| 2014/0082073 A1 | 3/2014 | Wable |
| 2014/0082101 A1 | 3/2014 | Wable |
| 2014/0089406 A1 | 3/2014 | Gniffke et al. |
| 2014/0133632 A1 | 5/2014 | Wakai et al. |
| 2014/0136989 A1 | 5/2014 | Choi |
| 2014/0156416 A1 | 6/2014 | Goenka |
| 2014/0164535 A1 | 6/2014 | Lynch et al. |
| 2014/0172925 A1 | 6/2014 | Goldbrenner et al. |
| 2014/0181697 A1 | 6/2014 | Kirigin |
| 2014/0189818 A1 | 7/2014 | Meyer |
| 2014/0195885 A1 | 7/2014 | Thiruvidam et al. |
| 2014/0208220 A1 | 7/2014 | Watal |
| 2014/0210756 A1 | 7/2014 | Lee |
| 2014/0215551 A1 | 7/2014 | Allain |
| 2014/0215568 A1* | 7/2014 | Kirigin ................. G06F 21/00 726/4 |
| 2014/0222701 A1 | 8/2014 | Loh et al. |
| 2014/0222917 A1 | 8/2014 | Poirier |
| 2014/0237464 A1 | 8/2014 | Waterman et al. |
| 2014/0280602 A1 | 9/2014 | Quatrano |
| 2014/0281870 A1 | 9/2014 | Vogel et al. |
| 2014/0289351 A1 | 9/2014 | Chen et al. |
| 2014/0289360 A1 | 9/2014 | Mahkovec et al. |
| 2014/0289645 A1 | 9/2014 | Megiddo et al. |
| 2014/0289658 A1 | 9/2014 | Prosol |
| 2014/0294167 A1 | 10/2014 | Kim et al. |
| 2014/0297759 A1 | 10/2014 | Mody |
| 2014/0298207 A1 | 10/2014 | Ittah et al. |
| 2014/0304618 A1 | 10/2014 | Carriero |
| 2014/0304836 A1 | 10/2014 | Velamoor et al. |
| 2014/0344739 A1 | 11/2014 | Yoon |
| 2014/0359465 A1 | 12/2014 | Litan Sever et al. |
| 2014/0365263 A1 | 12/2014 | Honeyman et al. |
| 2014/0365432 A1 | 12/2014 | Jain |
| 2014/0372539 A1 | 12/2014 | Zaveri |
| 2014/0372923 A1 | 12/2014 | Rossi et al. |
| 2015/0019480 A1 | 1/2015 | Maquaire et al. |
| 2015/0019654 A1 | 1/2015 | Wheeler et al. |
| 2015/0026260 A1 | 1/2015 | Worthley |
| 2015/0026604 A1 | 1/2015 | Mulukuri et al. |
| 2015/0032692 A1 | 1/2015 | Litzenberger |
| 2015/0032829 A1 | 1/2015 | Barshow et al. |
| 2015/0058751 A1 | 2/2015 | Tseng |
| 2015/0074044 A1 | 3/2015 | Metreveli et al. |
| 2015/0095799 A1 | 4/2015 | Tsao |
| 2015/0100889 A1 | 4/2015 | Tuchman |
| 2015/0134751 A1 | 5/2015 | Meyers et al. |
| 2015/0134808 A1 | 5/2015 | Fushman et al. |
| 2015/0135097 A1 | 5/2015 | Carriero et al. |
| 2015/0135300 A1 | 5/2015 | Ford |
| 2015/0149929 A1 | 5/2015 | Shepherd et al. |
| 2015/0156274 A1 | 6/2015 | Alten |
| 2015/0169566 A1 | 6/2015 | Yang |
| 2015/0188960 A1 | 7/2015 | Alhaidar |
| 2015/0200885 A1 | 7/2015 | Sharp et al. |
| 2015/0213037 A1 | 7/2015 | Baldwin et al. |
| 2015/0286371 A1 | 10/2015 | Degani |
| 2015/0288775 A1 | 10/2015 | Larabie-Belanger |
| 2015/0304265 A1 | 10/2015 | Vincent |
| 2016/0034844 A1 | 2/2016 | Kofman |
| 2016/0085421 A1* | 3/2016 | Feeney ............... G06F 3/04845 715/752 |
| 2016/0094495 A1 | 3/2016 | Ahuja et al. |
| 2016/0127452 A1 | 5/2016 | Newman et al. |
| 2016/0140139 A1 | 5/2016 | Torres et al. |
| 2016/0247245 A1 | 8/2016 | Baic |
| 2016/0259508 A1 | 9/2016 | Eccleston et al. |
| 2016/0277537 A1 | 9/2016 | Liang et al. |
| 2016/0283085 A1 | 9/2016 | Beausoleil et al. |
| 2016/0283502 A1 | 9/2016 | Beausoleil et al. |
| 2016/0283567 A1 | 9/2016 | Beausoleil et al. |
| 2016/0285702 A1 | 9/2016 | Beausoleil et al. |
| 2016/0285795 A1 | 9/2016 | Beausoleil et al. |
| 2016/0285796 A1 | 9/2016 | Beausoleil et al. |
| 2016/0285797 A1 | 9/2016 | Beausoleil et al. |
| 2016/0285817 A1 | 9/2016 | Beausoleil et al. |
| 2016/0285818 A1 | 9/2016 | Beausoleil et al. |
| 2016/0285890 A1 | 9/2016 | Beausoleil et al. |
| 2017/0006102 A1 | 1/2017 | Mody et al. |
| 2017/0046531 A1 | 2/2017 | Roberts |
| 2017/0139557 A1 | 5/2017 | Heo et al. |
| 2017/0192656 A1 | 7/2017 | Pedrick et al. |
| 2017/0220605 A1 | 8/2017 | Nivala et al. |
| 2017/0220657 A1 | 8/2017 | Nivala et al. |
| 2018/0189735 A1 | 7/2018 | Lo et al. |

FOREIGN PATENT DOCUMENTS

| | | |
|---|---|---|
| AU | 2016235985 | 9/2016 |
| AU | 2016236015 | 9/2016 |

(56) References Cited

FOREIGN PATENT DOCUMENTS

| | | |
|---|---|---|
| AU | 2016201019 A1 | 10/2016 |
| AU | 2016201472 A1 | 10/2016 |
| AU | 2017201395 | 3/2017 |
| AU | 2017204625 | 7/2017 |
| CN | 1527226 | 9/2004 |
| CN | 101689188 | 3/2010 |
| CN | 102375858 | 3/2012 |
| CN | 107431631 | 12/2017 |
| CN | 107438840 | 12/2017 |
| EP | 3073673 A1 | 9/2016 |
| EP | 3073674 A1 | 9/2016 |
| EP | 3251288 | 12/2017 |
| EP | 3251289 | 12/2017 |
| EP | 3251290 | 12/2017 |
| EP | 3251305 | 12/2017 |
| JP | 61-279916 A | 12/1986 |
| JP | 2000-060803 A | 2/2000 |
| JP | 2000105731 | 4/2000 |
| JP | 2001-202405 A | 7/2001 |
| JP | 2002-244988 A | 8/2002 |
| JP | 2002-297883 | 10/2002 |
| JP | 2003-256323 A | 9/2003 |
| JP | 2003-316629 | 11/2003 |
| JP | 2004-013267 A | 1/2004 |
| JP | 2004-362118 | 12/2004 |
| JP | 2005-346704 | 12/2005 |
| JP | 2006-092074 | 4/2006 |
| JP | 2006-155550 | 6/2006 |
| JP | 2006-189958 | 7/2006 |
| JP | 2007-072523 A | 3/2007 |
| JP | 2007323561 | 12/2007 |
| JP | 2009-069899 A | 4/2009 |
| JP | 2013-161481 A | 8/2013 |
| JP | 2013-175059 A | 9/2013 |
| JP | 2014-134961 A | 7/2014 |
| JP | 2014164717 | 9/2014 |
| JP | 2015-032092 | 2/2015 |
| JP | 2015-032092 A | 2/2015 |
| JP | 2016-181250 A | 10/2016 |
| JP | 2016-184404 A | 10/2016 |
| JP | 6028118 | 11/2016 |
| JP | 2017-084356 | 5/2017 |
| JP | 2017-182790 | 10/2017 |
| WO | 2010/102296 A1 | 9/2010 |
| WO | 2013/033144 | 3/2013 |
| WO | 2016/085822 | 6/2016 |
| WO | 2016/153676 A1 | 9/2016 |
| WO | 2016/153735 A1 | 9/2016 |
| WO | 2016/153736 A1 | 9/2016 |
| WO | 2016/153737 A1 | 9/2016 |

OTHER PUBLICATIONS

Vicky et al., A Collaborative Extensible User Environment for Simulation and Knowledge Management, @2015, IEEE, 7 pages.

Stephen Voida et al., "Share and Share Alike: Exploring the User Interface Affordances of File Sharing", Proceedings of the ACM Conference on Human Factors in Computing Systems (CHI 2006), Apr. 22-27, 2006, Montreal, Quebec, Canada, ACM, 10 pages.

Shimada, "Online Storage Service having Documents-Editing Functions: Introduction to Google Drive for a Person that Missed the Wave," ITmedia Inc., Feb. 7, 2014, [Searched May 27, 2016], Internet <URL: https://web.archive.org/web/20140207083317/http://www.atmarkit.co.jp/ait/articles/1303/13/news105.html>.

Mashable, "5 Unusual Ways to Use Dropbox You Might Not Have Thought of", 2010, retrieved from http://mashable.com.

Iwashi, "How to use Google Documents," Wind-mill Iwashi Blog, Dec. 17, 2014, [Searched May 27, 2016], Internet <URL: http://wind-mill.co.jp/iwashiblog/2014/12/google-document!>.

Intralink VIA, .RTM.2015; https://www/intralinks.com/sites/default/files/file.sub.--attach/intralin- ks.sub.-via.sub.-brochure,pdf; 13 pages.

Hoomey, Estyle Inc., "How to Use Google Drive's 'Spread Sheet' that Is Usable instead of Excel!", Nov. 9, 2013, [Searched May 27, 2016], Internet <URL: https://web.archive.org/web/20131109104805/http://hoomey.net/googledrive-study-4>.

Google, Inc., "View and create documents on Android," Mar. 19, 2015, Wayback Machine, GoogleDocs (downloaded May 30, 2016 from <URL: https://web.archive.org/web/20150319022434/https://support.google.com/docs/answer/3420399?hl=en>).

Digital Documents Laboratories, Beliz System, "Making Documents on Google Drive," Jul. 18, 2014, [Searched May 27, 2016], Internet <URL:https://watasu.com/dedoken/cloud/page2.html>.

Crucial Works, Inc., "Sharing Folders", Apps x Support, Jan. 29, 2013, [Searched May 27, 2016], Internet <URL: https://web.archive.org/web/20130129101828/http://www.appsuooort.jp/drive/share-folder>.

Alan Mislove et al., "POST: A secure, resilient, cooperative messaging system," Conference: Proceedings of HotOS'03: 9th Workshop on Hot Topics in Operating Systems, May 18-21, 2003, Lihue (Kauai), Hawaii, USA, 6 pages.

International Search Report and Written Opinion for PCT Application No. PCT/US2017/061204 dated Dec. 21, 2017, 9 pages.

International Search Report and Written Opinion for PCT Application No. PCT/US2017/061206 dated Jan. 3, 2018, 11 pages.

International Search Report and Written Opinion for PCT Application No. PCT/US2016/020117 dated May 13, 2016, 10 pages.

International Search Report and Written Opinion for PCT Application No. PCT/US2016/019052 dated Nov. 7, 2016, 8 pages.

International Search Report and Written Opinion for PCT Application No. PCT/US2016/020124 dated May 24, 2016, 10 pages.

International Search Report and Written Opinion for PCT Application No. PCT/US2016/020132 dated May 24, 2016, 9 pages.

Extended European Search Report for EP Application No. 16161853.3 dated Aug. 18, 2016, 3 pages.

Extended European Search Report for EP Application No. 16161962.2 dated Aug. 24, 2016, 3 pages.

International Preliminary Report on Patentability for PCT Application No. PCT/US16/19052, dated Oct. 5, 2017, 7 pages.

International Preliminary Report on Patentability for PCT Application No. PCT/US16/20117, dated Oct. 5, 2017, 8 pages.

International Preliminary Report on Patentability for PCT Application No. PCT/US16/20124, dated Oct. 5, 2017, 8 pages.

International Preliminary Report on Patentability for PCT Application No. PCT/US16/20132, dated Oct. 5, 2017, 8 pages.

Non-Final Office Action from JP Patent Application No. 2018-190286, dated Oct. 4, 2019, 5 pages.

Communication under Rule 71(3) EPC for European Application No. 16711411.5 dated Oct. 18, 2019, 7 pages.

Extended European Search Report for European Application No. 19195083.1 dated Oct. 31, 2019, 8 pages.

Non-Final Office Action from U.S. Appl. No. 15/476,688, dated Nov. 18, 2019, 23 pages.

Non-Final Office Action from U.S. Appl. No. 15/476,755, dated Nov. 29, 2019, 23 pages.

Notice of Allowance from U.S. Appl. No. 15/395,220, dated May 20, 2019, 7 pages.

Communication pursuant to Article 94(3) EPC for European Application No. 16720200.1 dated Sep. 30, 2019, 5 pages.

Extended European Search Report for EP Application No. 19182606.4 dated Aug. 8, 2019, 9 pages.

Non-Final Office Action from U.S. Appl. No. 14/725,942, dated Sep. 27, 2019, 26 pages.

Non-Final Office Action from U.S. Appl. No. 14/725,958, dated Sep. 27, 2019, 25 pages.

Non-Final Office Action from U.S. Appl. No. 14/725,982, dated Sep. 20, 2019, 13 pages.

Notice of Allowance from U.S. Appl. No. 14/725,905, dated Oct. 2, 2019, 15 pages.

Notice of Allowance from U.S. Appl. No. 14/726,103, dated Sep. 16, 2019, 2 pages.

Office Action for Australian Application No. 2016235984 dated Mar. 22, 2018, 3 pages.

Office Action for Japanese Application No. 2017-544960 dated Mar. 16, 2018, 10 pages. (English Translation only).

Non-Final Office Action from U.S. Appl. No. 15/476,715, dated Oct. 4, 2019, 24 pages.

(56) References Cited

OTHER PUBLICATIONS

Office Action for Australian Application No. 2017385025 dated Nov. 28, 2019, 5 pages.
Office Action for Chinese Application No. 201680013771.1 dated Dec. 4, 2019, 12 pages.
Office Action for Australian Application No. 2017385026 dated Nov. 28, 2019, 6 pages.
Communication pursuant to Article 94(3) EPC for European Application No. 17805064.7 dated Nov. 5, 2019, 4 pages.

* cited by examiner

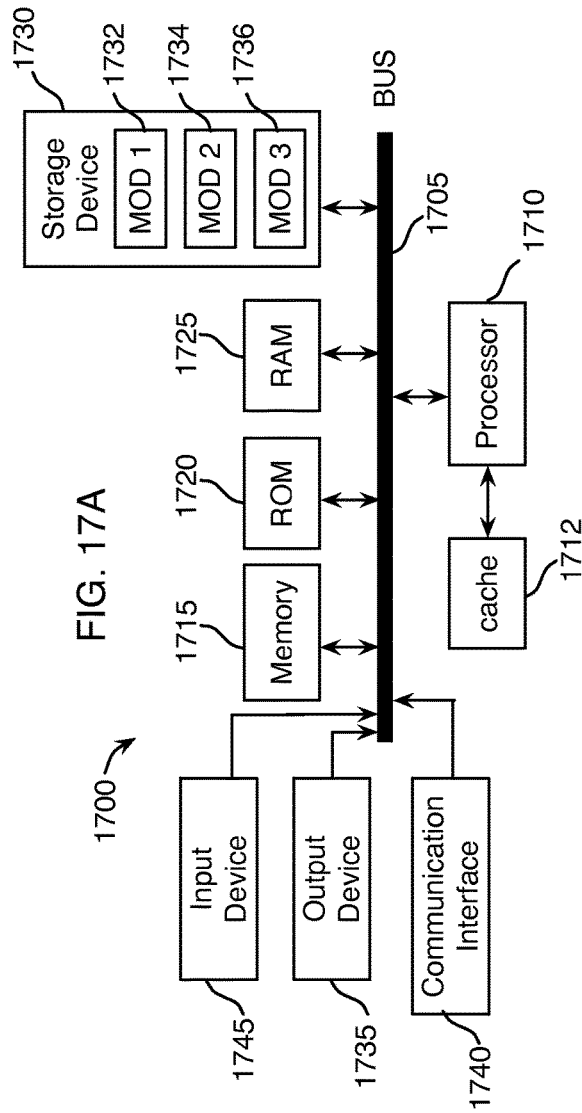
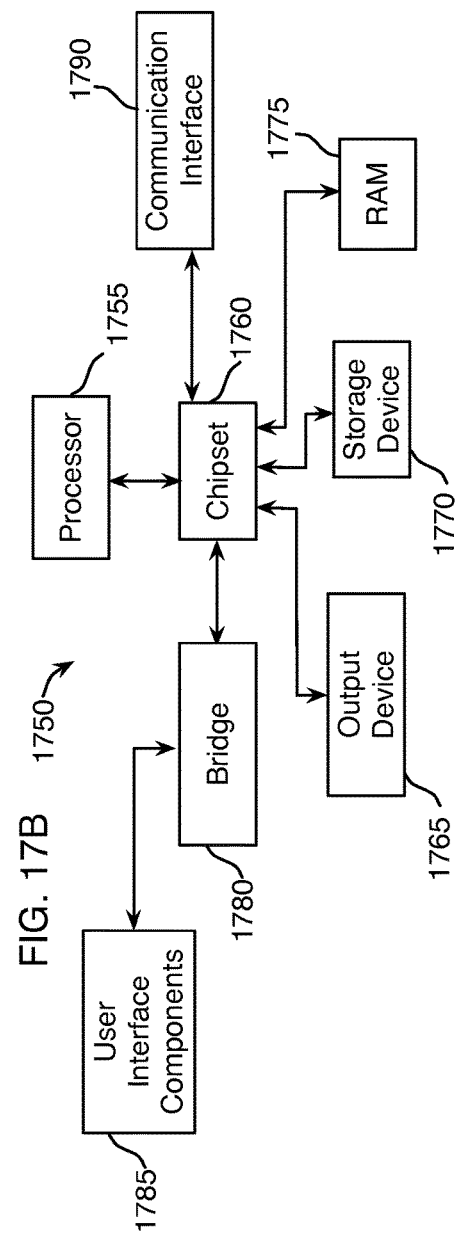
FIG. 17A
FIG. 17B

SHARED FOLDER BACKED INTEGRATED WORKSPACES

CROSS REFERENCE TO RELATED APPLICATIONS

This application is a continuation of U.S. patent application Ser. No. 14/726,030, filed May 29, 2015 and claims the benefit of and priority to U.S. Provisional Patent Application No. 62/136,871, filed on Mar. 23, 2015, entitled "Shared Folder Backed Integrated Workspaces," the content of which is incorporated herein by reference in its entirety.

TECHNICAL FIELD

The present technology pertains to content management systems, and more specifically pertains to integrated collaborative environments.

BACKGROUND

Employees of modern companies use many different software tools to perform a variety of job functions. E-mail, instant messaging, chat, and text (SMS) messaging are all used to communicate with coworkers and project teammates. Different file systems (e.g., local machine drives, network drives, cloud storage, etc.) are used to keep track of documents, media items, and other content items that are necessary for performing work or that are the result of work. Different applications are used to view, create, and edit the various content items used by employees during the workday. While this variety of communication mechanisms, digital storage locations, and productivity applications adds flexibility to the work environment, it also adds complexity and inefficiency when the employee needs to figure out how to communicate with coworkers, where work related content items are located, and which applications are needed to view, create and edit the various content items (documents, files, images, media, etc.) that are necessary for performing the employee's job functions.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for shared folder backed integrated workspaces. In some implementations, a content management system can provide a graphical user interface (GUI) that integrates communications and content management into a single user interface. The user interface can include mechanisms that allow a user to provide input to generate a new workspace. The user interface can provide a mechanism to allow a user to view conversations related to the workspace and/or content items associated with the workspace. The user interface can present representations of content items associated with the workspace and allow the user to provide input to generate, view, edit, and share content items associated with the workspace.

In some implementations, an online shared folder of a content management system can serve as a repository for content items and messages associated with the workspace represented by the graphical user interface. For example, the messages, comments, or other communications presented on the workspace GUI can be stored in the online shared folder and synced with a local shared folder on a user's client device. The content items discussed, shared, created and/or edited through the workspace GUI can be stored in the shared folder. The shared folder can be shared with members (e.g., users, employees, project teammates, etc.) of the workspace. For example, the messages, content items, and other objects stored in one user's local copy of the online shared folder on the user's device can be synchronized with other users' local shared folders on the other users' devices. In some implementations, the workspace GUI can be generated based on the contents of the online and/or local shared folder. For example, the workspace GUI can represent the contents (e.g., messages, content items, etc.) of the online and/or local shared folder.

In some implementations, a user can create a new content item using a browser interface to an online content management system. The user can specify the type of content item (e.g., document) to create and a name for the content item. The content item type and name can be sent to the content management system. The content management system can store templates corresponding to each type of document that can be created. Upon receipt of the request to create the new content item, the content management system can copy the template corresponding to the requested content item type, rename the template copy to the specified name and save the new content item to the users folder on the content management system. The online folder can then be synchronized with corresponding folders on the user's device. The user can access the new content item from the local folder to view and edit the new content item.

In some implementations, when an authorized user is accessing a content item in the workspace through a web browser on a client device, the web browser can recognize that the user has a local version of the content item in a local folder (e.g., corresponding to the online shared folder) on the client device and present an option to the user allowing the user to select a preview (e.g., web delivered image) version of the content item or select to open the local version of the content item in a native application on the client device. When the user selects to open the local version of the content item in the native application, the user can edit the content item and all changes will be automatically synced back to the online shared folder.

In some implementations, the workspace can integrate email and workspace messaging (e.g., chat) features so that workspace members can use email and workspace messaging interchangeably. The workspace can be assigned a workspace email address (email mailing list). Emails addressed to/from the workspace email address can be obtained (e.g., from user's email account, from email server, etc.) and workspace chat messages can be generated for each email address and added to the workspace message stream. When an authorized user generates a workspace chat message, an email corresponding to the workspace chat message (e.g., including the message content) can be generated and sent to subscribers (e.g., authorized users of the shared folder) to the workspace email mailing list.

In some implementations, email messages sent to a mail list associated with the shared folder can be transformed into workspace (e.g., chat stream) messages. When email messages contain attachments, the attachments can be stripped from the email messages, stored in the shared folder and the message can be presented in the message stream on the workspace user interface with a link to the attachment stored in the online shared folder.

In some implementations, email messages associated with content items can be inserted into the content items as comments. For example, if an email includes a content item attachment, the body (text) of the email message can be inserted into the content item as a comment. If an email refers to a content time, or is in an email thread associated with a content item, then the email can be inserted into the content item as a comment. The comments inserted into a content item can be presented on a user interface when the user views the content item.

In some implementations, a user can select a content item, upon selection an options user interface can be displayed where the user can select a "discuss" option. When the user selects the discuss option, the content item can be presented in a new message in the message stream and the user can enter a message to start a conversation (e.g., message thread) about the selected content item.

In some implementations, comments in native document (e.g., word document comments) or previews (e.g., metadata) are added to the workspace message stream as conversations about the content item. When edits are made to content items, a new message can be generated to indicate what changes were made and the new message can be added to the message stream or to a message thread corresponding to the content item.

In some implementations, when a user adds a content item to a workspace message (e.g., a chat post), the content item is automatically added to the shared folder for the workspace and synchronized with the client devices of authorized users of the shared folder. In some implementations, adding the content item to the chat message or post can trigger (e.g., initiate) synchronization of the content item with the client devices of workspace members.

In some implementations, conversations specific to a content item across different conversation modes (e.g., email, workspace messaging, chat, text message, etc.) can be aggregated and associated with the content item. The user can then view all conversations specific to the content item in a single location. For example, a user could click on a content item to trigger a conversation view of the content item. In the conversation view the user will see all conversations specific to that content item (e.g., from email, chat, comments in documents, etc.).

In some implementations, a workspace user interface can present a message stream (e.g., messages from various users arranged in time order). The message stream can include individual messages and threaded messages. Threaded messages can be, for example, multiple related messages (e.g., original message, reply message, reply to reply) in a conversation. When an individual message is received, the default behavior of the message stream can be to scroll existing messages and add the new message. However, when a user is interacting with an existing message or message thread (e.g., hovering a cursor over an existing message, entering a reply to an existing message), the scrolling behavior is stopped (e.g., the message stream is frozen) while the user interacts with the existing message or message thread. Once the user stops interacting with the existing message, the scrolling behavior of the message stream can be resumed.

In some implementations, a workspace member can mention an external user in a workspace message. The online content management system can determine that an external user has been mentioned, obtain contact information for the external user, and send the chat message to the external user using a communication mechanism identified in the external user's contact information (e.g., email, text message, sms message, etc.). The external user can reply to the chat message using the same communication mechanism. When the external user's reply is received by the content management system, the content management system can generate a chat message that includes the content of the external user's reply.

BRIEF DESCRIPTION OF THE DRAWINGS

The above recited and other advantages and features of the disclosure will become apparent by reference to specific embodiments thereof that are illustrated in the appended drawings. Understanding that these drawings depict only example embodiments of the disclosure and are not therefore to be considered to be limiting of its scope, the principles herein are described and explained with additional specificity and detail through the use of the accompanying drawings in which:

FIG. 17A shows an example possible system embodiment for implementing various embodiments of the present technology; and FIG. 17B shows an example possible system embodiment for implementing various embodiments of the present technology.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an integrated collaborative workspace that provides a single user interface to communicate with coworkers, generate and access work product (e.g., files, media, documents, digital content items, etc.), and access the software applications that are necessary to conduct business in the modern world.

Figure 1:
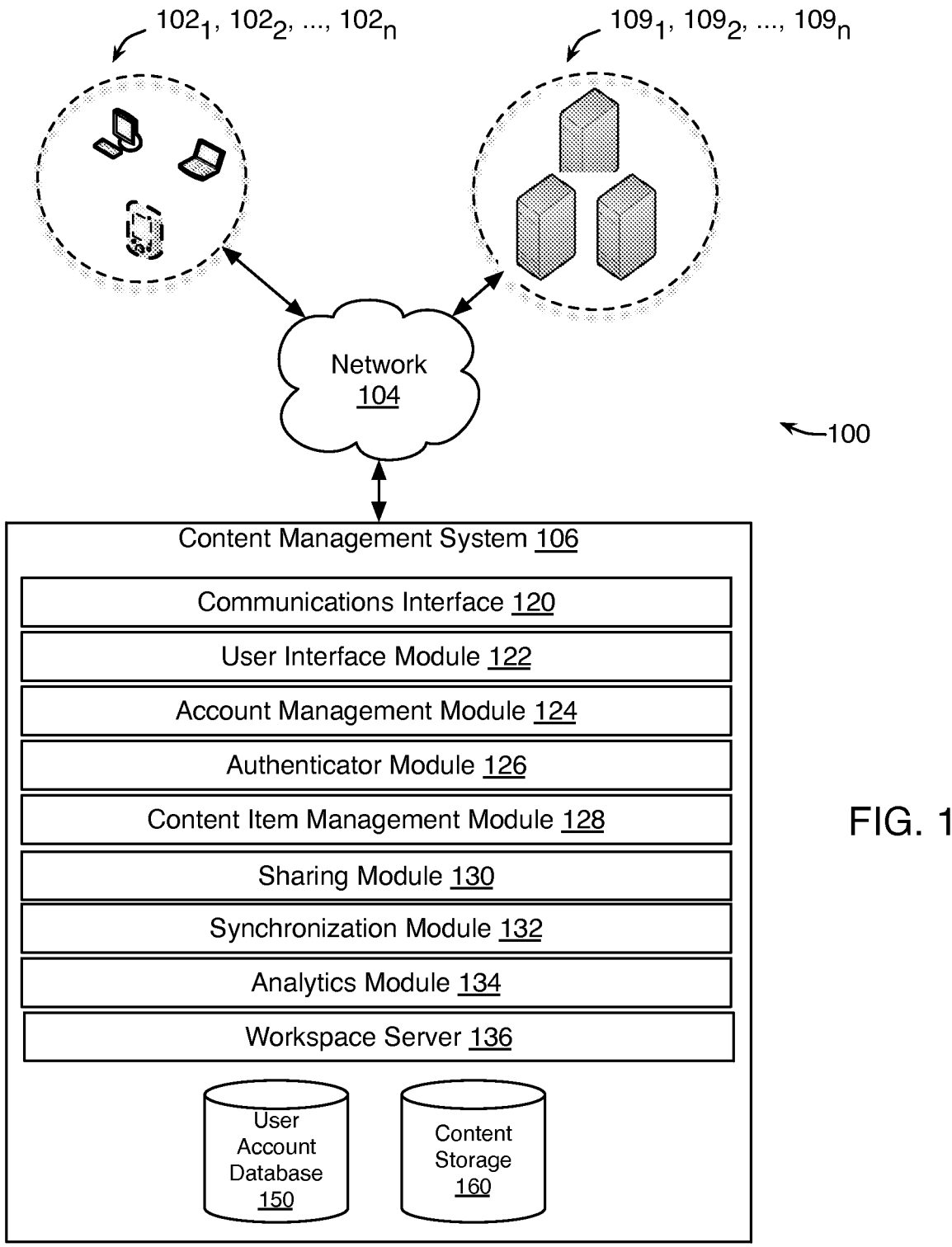
FIG. 1 is a block diagram of an example system configuration for implementing shared folder backed integrated workspaces.

FIG. 1 is a block diagram of an example system configuration 100 for implementing shared folder backed integrated workspaces, wherein electronic devices communicate through a network for purposes of exchanging content and other data. The system can be configured for use on a wide area network such as that illustrated in FIG. 1. However, the present principles are applicable to a wide variety of network configurations that facilitate the intercommunication of electronic devices. For example, each of the components of system 100 in FIG. 1 can be implemented in a localized or distributed fashion in a network.

In system 100, a user can interact with content management system 106 through client devices $102_1$, $102_2$, . . . , $102_n$ (collectively "102") connected to network 104 by direct and/or indirect communication. Content management system 106 can support connections from a variety of different client devices, such as desktop computers; mobile computers; mobile communications devices, e.g. mobile phones, smart phones, tablets; smart televisions; set-top boxes; and/or any other network enabled computing devices. Client devices 102 can be of varying type, capabilities, operating systems, etc. Furthermore, content management system 106 can concurrently accept connections from and interact with multiple client devices 102.

A user can interact with content management system 106 through a client-side application installed on client device $102_i$. In some embodiments, the client-side application can include a content management system specific component. For example, the component can be a stand-alone application, one or more application plug-ins, and/or a browser extension. However, the user can also interact with content management system 106 through a third-party application, such as a web browser, that resides on client device $102_i$ and is configured to communicate with content management system 106. In either case, the client-side application can present a user interface (UI) for the user to interact with content management system 106. For example, the user can interact with the content management system 106 through a client-side application integrated with the file system or through a webpage displayed using a web browser application.

Content management system 106 can make it possible for a user to store content, as well as perform a variety of content management tasks, such as retrieve, modify, browse, and/or share the content. Furthermore, content management system 106 can make it possible for a user to access the content from multiple client devices 102. For example, client device $102_i$ can upload content to content management system 106 through network 104. The content can later be retrieved from content management system 106 using the same client device $102_i$ or some other client device $102_j$.

To facilitate the various content management services, a user can create an account with content management system 106. The account information can be maintained in user account database 150. User account database 150 can store profile information for registered users. In some cases, the only personal information in the user profile can be a username and/or email address. However, content management system 106 can also be configured to accept additional user information.

User account database 150 can also include account management information, such as account type, e.g. free or paid; usage information, e.g. file edit history; maximum storage space authorized; storage space used; content storage locations; security settings; personal configuration settings; content sharing data; etc. Account management module 124 can be configured to update and/or obtain user account details in user account database 150. The account management module 124 can be configured to interact with any number of other modules in content management system 106.

An account can be used to store content, such as digital data, documents, text files, audio files, video files, etc., from one or more client devices 102 authorized on the account. The content can also include folders or other mechanisms of grouping content items together with different behaviors, such as collections, playlists, albums, etc. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder. For example, the permissions settings associated with a shared folder can indicate that only certain users (e.g., users associated with a business, project team, workspace, etc.) can access the shared folder.

The content can be stored in content storage 160. Content storage 160 can be a storage device, multiple storage devices, or a server. Alternatively, content storage 160 can be a cloud storage provider or network storage accessible through one or more communications networks. Content management system 106 can hide the complexity and details from client devices 102 so that client devices 102 do not need to know exactly where the content items are being stored by content management system 106. In one variation, content management system 106 can store the content items in the same folder hierarchy as they appear on client device $102_i$. However, content management system 106 can store the content items in its own order, arrangement, or hierarchy. Content management system 106 can store the content items in a network accessible storage (SAN) device, in a redundant array of inexpensive disks (RAID), etc. Content storage 160 can store content items using one or more partition types, such as FAT, FAT32, NTFS, EXT2, EXT3, EXT4, ReiserFS, BTRFS, and so forth.

Content storage 160 can also store metadata describing content items, content item types, and the relationship of content items to various accounts, folders, or groups. The metadata for a content item can be stored as part of the content item or can be stored separately. In one variation, each content item stored in content storage 160 can be assigned a system-wide unique identifier.

Content storage 160 can decrease the amount of storage space required by identifying duplicate files or duplicate segments of files. Instead of storing multiple copies, content storage 160 can store a single copy and then use a pointer or other mechanism to link the duplicates to the single copy. Similarly, content storage 160 can store files more efficiently, as well as provide the ability to undo operations, by using a file version control that tracks changes to files, different versions of files (including diverging version trees), and a change history. The change history can include a set of changes that, when applied to the original file version, produce the changed file version.

Content management system 106 can be configured to support automatic synchronization of content from one or more client devices 102. The synchronization can be platform agnostic. That is, the content can be synchronized across multiple client devices 102 of varying type, capabilities, operating systems, etc. For example, client device $102_i$ can include client software, which synchronizes, through a synchronization module 132 at content management system 106, content in client device $102_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 106. Conversely, the background process can identify content that has been updated at content management system 106 and synchronize those changes to the local folder. The client software can provide notifications of synchronization operations, and can provide indications of content statuses directly within the content management application. Sometimes client device $102_i$ may not have a network connection available. In this scenario, the client software can monitor the linked folder for file changes and queue those changes for later synchronization to content management system 106 when a network connection is available. Similarly, a user can manually stop or pause synchronization with content management system 106.

A user can also view or manipulate content through a web interface generated and served by user interface module 122. For example, the user can navigate in a web browser to a web address provided by content management system 106. Changes or updates to content in the content storage 160 made through the web interface, such as uploading a new version of a file, can be propagated back to other client devices 102 associated with the user's account. For example, multiple client devices $102_i$, each with their own client software, can be associated with a single account and files in the account can be synchronized between each of the multiple client devices 102.

Content management system 106 can include a communications interface 120 for interfacing with various client devices $102_i$ and can interact with other content and/or service providers $109_1$, $109_2$, ..., $109_n$ (collectively "109") through an Application Programming Interface (API). Certain software applications can access content storage 160 through an API on behalf of a user. For example, a software package, such as an app on a smartphone or tablet computing device, can programmatically make calls directly to content management system 106, when a user provides credentials, to read, write, create, delete, share, or otherwise manipulate content. Similarly, the API can allow users to access all or part of content storage 160 through a web site.

Content management system 106 can also include authenticator module 126, which can verify user credentials, security tokens, API calls, specific client devices, and so forth, to ensure only authorized clients and users can access files. Further, content management system 106 can include analytics module 134 that can track and report on aggregate file operations, user actions, network usage, total storage space used, as well as other technology, usage, or business metrics. A privacy and/or security policy can prevent unauthorized access to user data stored with content management system 106.

Content management system 106 can include sharing module 130 for managing sharing content publicly or privately. Sharing content publicly can include making the content item accessible from any computing device in network communication with content management system 106. Sharing content privately can include linking a content item in content storage 160 with two or more user accounts so that each user account has access to the content item. The sharing can be performed in a platform agnostic manner. That is, the content can be shared across multiple client devices 102 of varying type, capabilities, operating systems, etc. The content can also be shared across varying types of user accounts.

In some embodiments, content management system 106 can be configured to maintain a content directory identifying the location of each content item in content storage 160. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 106 can use the content path to present the content items in the appropriate folder hierarchy.

A content entry can also include a content pointer that identifies the location of the content item in content storage 160. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 130 can be configured to add a user account identifier to the content entry associated with the content item, thus granting the added user account access to the content item. Sharing module 130 can also be configured to remove user account identifiers from a content entry to restrict a user account's access to the content item.

To share content publicly, sharing module 130 can be configured to generate a custom network address, such as a uniform resource locator (URL), which allows any web browser to access the content in content management system 106 without any authentication. To accomplish this, sharing module 130 can be configured to include content identification data in the generated URL, which can later be used to properly identify and return the requested content item. For example, sharing module 130 can be configured to include the user account identifier and the content path in the generated URL. Upon selection of the URL, the content identification data included in the URL can be transmitted to content management system 106 which can use the received content identification data to identify the appropriate content entry and return the content item associated with the content entry.

In addition to generating the URL, sharing module 130 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 130 can be configured to change the value of the flag to 1 or true after generating a URL to the content item.

In some embodiments, sharing module 130 can also be configured to deactivate a generated URL. For example, each content entry can also include a URL active flag indicating whether the content should be returned in response to a request from the generated URL. For example, sharing module 130 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 130 can reactivate the URL by again changing the value of the URL active flag to 1 or true. A user can thus easily restore access to the content item without the need to generate a new URL.

Content management system 106 can include workspace server 136. Workspace server 136 can be configured to manage shared folder backed workspaces. For example, workspace server 136 can receive workspace-related messages and content items and store the messages and content items in a shared folder associated with the workspace. Workspace server 136 can monitor the workspace shared folder and send state information describing the current state of the shared folder (e.g., messages, content, etc.) to client devices 102 so that client devices 102 can generate and display graphical user interfaces that allow users to interact with the workspace. For example, workspace server 136 can be a webserver that can serve browser-based workspace graphical user interfaces (e.g., web pages, web applications, etc.) to browsers running on user client devices 102. Workspace server 136 can be a server that delivers shared folder state information to workspace client applications (e.g., other than a browser) so that the workspace client applications can generate a graphical user interface representing the state of the workspace and/or content in the shared folder associated with the workspace. The various functions of workspace server 136 are described in further detail below.

While content management system 106 is presented with specific components, it should be understood by one skilled in the art, that the architectural configuration of system 106 is simply one possible configuration and that other configurations with more or less components are also possible.

Figure 2:
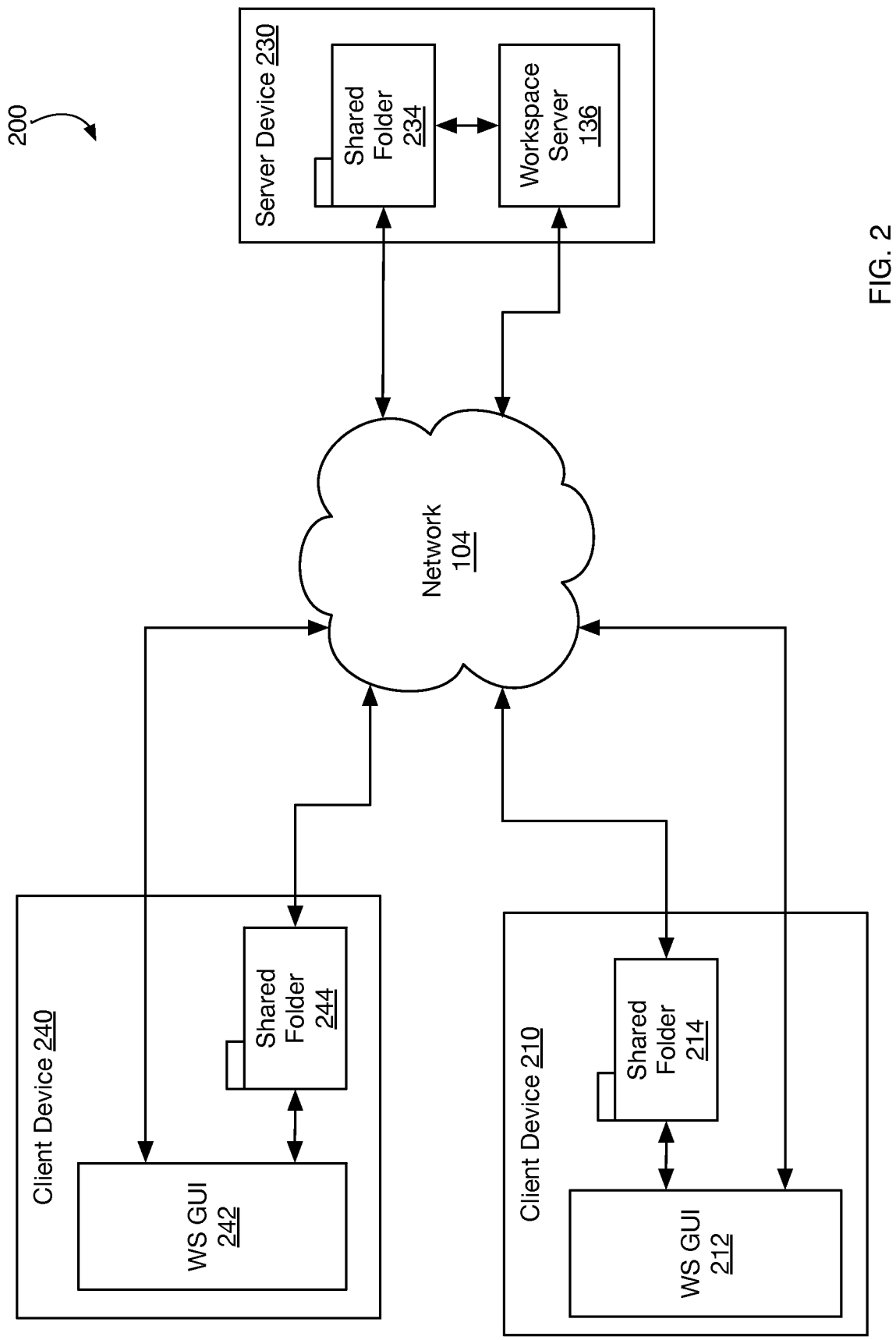
FIG. 2 is a block diagram of an example system for providing shared folder backed integrated workspaces.

FIG. 2 is a block diagram of an example system 200 for providing shared folder backed integrated workspaces. For example, system 200 can correspond to system 100 described above. A user of client device 210 (e.g., 102$_i$) can create an account with content management system 106. The user can create shared folder 214 associated with content management system 106 on client device 210. When shared folder 214 is created on client device 210, a corresponding shared folder 234 can be created on server device 230 of content management system 106. The user of client device 210 can share shared folder 214 with a user of client device 240 (e.g., 102$_j$). Once shared folder 214 is shared with the user of client device 240, a corresponding shared folder 244 can be created on client device 240. As described above, content management system 106 can synchronize shared folders 214, 234 and 244 so that content items added, modified, or deleted on one of the shared folders (e.g., shared folder 244) are correspondingly added, modified, or deleted in the corresponding shared folders (e.g., shared folders 214, 234) on other devices.

In some implementations, workspace server 136 can generate a workspace based on shared folder 234. For example, the user of client device 240 can view the contents of shared folder 234 through a web browser interface to content management system 106, as described above. While viewing the contents of shared folder 234 in the browser interface displayed on client device 240, the user can provide input (e.g., select a graphical element, such as a button or link) to cause workspace server 136 to generate a workspace based on shared folder 234 currently displayed on the web browser interface. For example, the web browser on client device 240 can send a message to workspace server 136 through network 104 requesting that a workspace be generated based on shared folder 234. Workspace server 136 can generate the workspace based on shared folder 234 and send workspace state information to client device 240 so that client device 240 can generate and display workspace graphical user interface 242 (e.g., WS GUI 242). For example, WS GUI 242 can be a webpage generated by workspace server 136 and served to a web browser running on client device 240. WS GUI 242 can be a graphical user interface of a native workspace client application running on client device 240. Similarly, a user of client device 210 can request a workspace based on shared folder 234 and workspace server 136 can send workspace state information to client device 210 so that client device 210 can generate and display workspace graphical user interface 212 on client device 210.

In some implementations, WS GUI 212 (or WS GUI 242) can view and interact with shared folder 234 through workspace server 136. For example, a user can provide input to WS GUI 212 to cause WS GUI 212 to request from workspace server 136 a preview image (e.g., a representation of content) of a content item stored in shared folder 234. Workspace server 136 can deliver the preview image to WS GUI 212 so that WS GUI 212 can display the preview image of the content item on a display of client device 210. In some implementations, WS GUI 212 can interact with shared folder 234 by directly accessing corresponding shared folder 214 resident on client device 210. For example, since shared folder 214 is synchronized with shared folder 234, the user of WS GUI 212 can view or manipulate shared folder 214 as if it were shared folder 234. For example, instead of requesting from workspace server 136 a preview image of a content item in shared folder 234, WS GUI 212 can access a copy of the content item stored locally in shared folder 214. Thus, sometimes WS GUI 212 will access the local shared folder 214 when interacting with a workspace and sometimes WS GUI 212 will request content or state information associated with a workspace (e.g., associated with shared folder 234) from workspace server 136.

Figure 3:
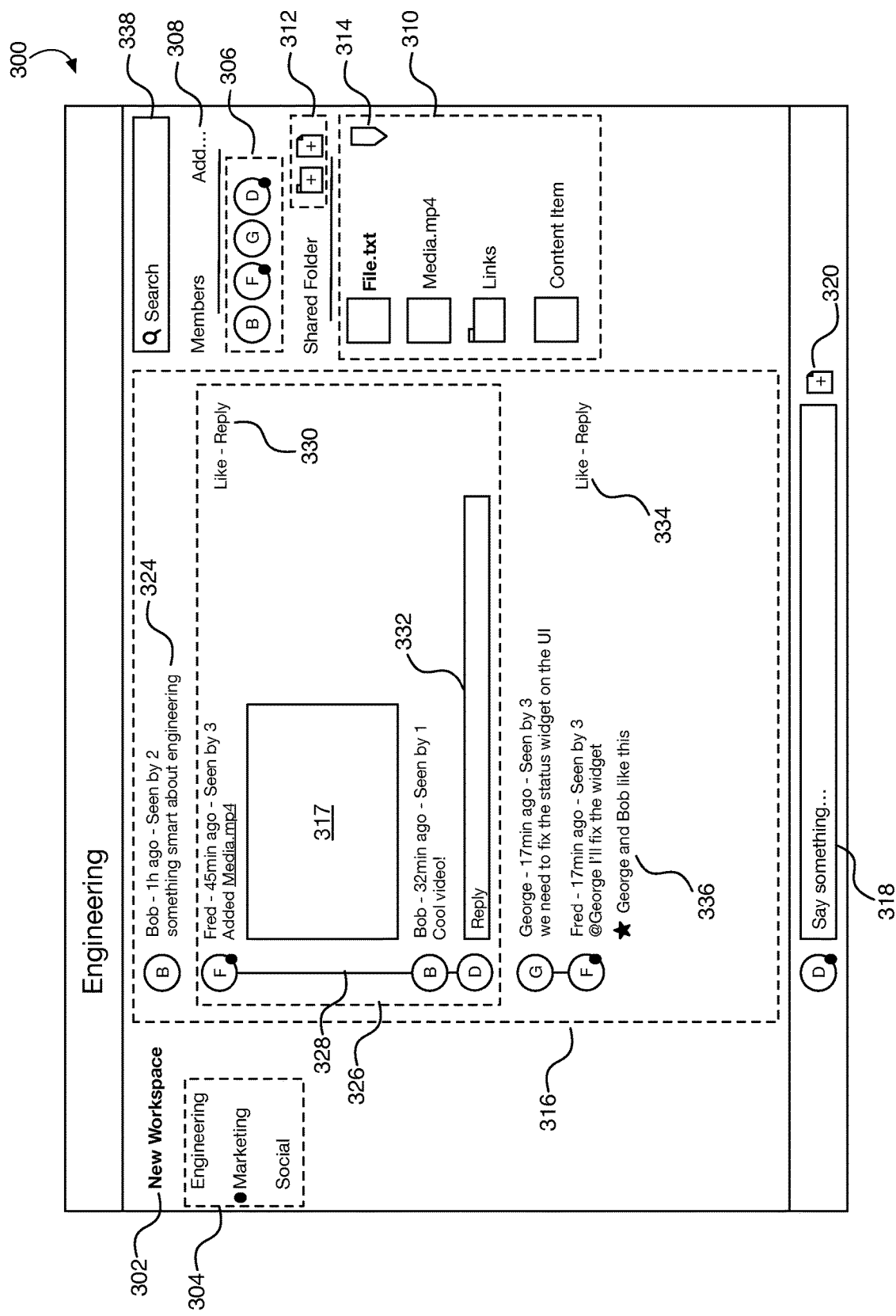
FIG. 3 illustrates an example workspace graphical user interface.

FIG. 3 illustrates an example workspace graphical user interface 300. For example, workspace graphical user interface 300 (e.g., WS GUI 300) can correspond to WS GUI 212 and/or WS GUI 242 of FIG. 2. WS GUI 300 can be a web page presented in a browser application of client device $102_i$. WS GUI 300 can be a graphical user interface generated by a native software application running on client device $102_i$.

In some implementations, WS GUI 300 can include a selectable graphical element 202 for creating a new workspace. For example, a user can select graphical element 302 (e.g., a button, link, etc.) to cause WS GUI 300 (e.g., the browser, or native application) to send a message to workspace server 136 requesting that a new workspace be generated. The user can specify (e.g., through a graphical user interface not shown) the name for the new workspace and an email address (e.g., mailing list, group email address, etc.) for the workspace. The message to workspace server 136 can include the specified name and email address. Upon receiving the message, workspace server 136 can generate a shared folder (e.g., shared folder 234) for the workspace and an email account (e.g., mail list) for the workspace. Workspace server 136 can send workspace (e.g., shared folder) state information to WS GUI 300 for presentation to the user. For example, workspace state information can include information about members of the workspace (e.g., member profiles, online status, etc.), content items in the shared folder, and/or messages generated by members of the workspace, among other things.

In some implementations, WS GUI 300 can include a listing of workspaces 304 to which the user belongs. For example, the user of WS GUI 300 may be a member of multiple workspaces 304 (e.g., Engineering, Marketing, Social, etc.). The user can select one of the workspaces 304 to view state information about the selected workspace. In the example WS GUI 300, the user has selected the "Engineering" workspace. Thus, WS GUI 300 currently presents state information about the Engineering workspace. The workspaces 304 listed on WS GUI 300 can include an indicator to notify the user when the state of a workspace has changed. For example, the "Marketing" workspace has a dot to the left of the workspace name indicating that something has changed within the workspace. For example, the change could be that a content item associated with the workspace (e.g., in the corresponding workspace shared folder) has been added, modified, or deleted. The change could be that a new message has been received in the workspace, for example.

In some implementations, WS GUI 300 can identify members of the displayed workspace. For example, WS GUI 300 can include graphical elements 306 that represent and/or identify members of the workspace and/or users who have access to the shared folder associated with the workspace. For example, each graphical element 306 can present an image representing a corresponding member of the workspace. The user of WS GUI 300 can select a graphical element 306 to view information about the corresponding member of the workspace. For example, a graphical user interface can be presented in response to selection of one of the graphical elements 306 that displays a user profile (e.g., name, contact information, online status, etc.) corresponding to the member associated with the selected graphical element 306. A graphical element 306 can include an online status indicator (e.g., green dot, highlighting, etc.) that indicates that the member corresponding to the graphical element 306 is online. For example, when the member is online, graphical element 306 will display the online status indicator. When the member is offline, graphical element 306 will not display the online status indicator.

In some implementations, WS GUI 300 can include graphical element 308 for adding a member to the workspace. For example, a user can select graphical element 308 to cause WS GUI 300 to present a graphical user interface for adding a new member to the workspace and/or shared folder associated with the workspace. The user can input the new member's name, email address, telephone number, and/or other data (e.g., company, department, project, etc.) associated with the new member. WS GUI 300 can send the new member's information to workspace server 136. Workspace server 136 can add the new member to the workspace and share the shared folder associated with the workspace with the new member. Workspace server 136 can add the new member to the email mailing list for the workspace.

In some implementations, WS GUI 300 can present content items stored in the shared folder of the displayed workspace. For example, WS GUI 300 can present graphical elements 310 that represent content items stored in shared folder 234 corresponding to the "Engineering" workspace. The user can select a graphical element 310 to view the content item and/or messages corresponding to the selected graphical element 310, as described further below. In some implementations, the presented graphical elements 310 can represent all of the content items in the shared folder. In some implementations, the graphical elements 310 can represent content items selected based on usage statistics associated with the respective content items. For example, the presented graphical elements 310 can represent the top five most recently accessed content items. The presented graphical elements 310 can represent the top ten most frequently accessed content items. The presented graphical elements 310 can represent the top six content items accessed by the most number of workspace members.

In some implementations, graphical elements 310 can include representations of one or more bookmarked content items in the shared folder corresponding to the workspace. For example, certain content items may be more important than others (e.g., more frequently accessed, a must read document for workspace members, etc.). A user can designate a content item as an important content item to have the content item flagged, bookmarked, or pinned to the top of the list of graphical elements 310 presented on WS GUI 300. Workspace server 136 can automatically designate a content item as an important content item based on a variety of factors. For example, workspace server 136 can determine which content items are accessed the most frequently or by the most members of the workspace and automatically designate the content items as important content items. The important content items can be pinned at the top of the list of graphical elements 310 so that the important content items are always easily accessible through WS GUI 300. The bookmarked content items can be the same for each member of the workspace. For example, every workspace member will see the same bookmarked content items when each member launches WS GUI 300. An important content item can be associated with a graphical indicator 314 (e.g., a flag, a pin, bookmark, etc.).

In some implementations, WS GUI 300 can include graphical elements 312 for adding a new content item to the workspace. For example, a user can select a graphical element 312 to add a new folder to shared folder 234 corresponding to the displayed workspace. A user can select a graphical element 312 to add a new content item (e.g., file, media item, etc.) to the workspace. Upon selection of graphical element 312, a graphical user interface can be presented to prompt the user to select an existing content item in the file system of the user's client device 210 for inclusion in the workspace. The user can select an existing content item on the user's client device 210 to have that content item stored in the local shared folder 214 corresponding to the workspace. WS GUI 300 can send a message to workspace server 136 indicating that a new content item has been added to shared folder 214 to cause the new content item in shared folder 214 to be synchronized with the corresponding shared folders 234 and 244. Thus, WS GUI 242 on client device 240 can be updated to display the new content item in the workspace.

Upon selection of graphical element 312, a graphical user interface can be presented to prompt the user to create a new content item in the workspace. The user can select the type of content item and provide a name for the content item. WS GUI 300 can send the content item type and name to workspace server 136. Workspace server 136 can generate a content item of the specified type and having the specified name and store the new content item in shared folder 234 associated with the workspace, as described further below.

In some implementations, WS GUI 300 can include message stream 316. For example, message stream 316 can include messages generated from a variety of sources, such as email, chat, text message, comments on content items, comments in content items, and workspace status updates. For example, when a user adds a content item to the workspace, as described above, a message can be added to message stream 316 indicating that the content item was added. Each message in the message stream can identify the workspace member who generated the message, indicate when the message was generated, and who has seen the message. For example, the workspace message can indicate how many workspace members have seen the message. The workspace message can identify which members have seen the message.

In some implementations, the user of WS GUI 300 can generate a new message by inputting (e.g., typing, pasting, dictating, etc.) a message into graphical element 318. Upon providing input (e.g., selecting a return button, selecting a send button, etc.) indicating that the user is finished composing the message, the message can be added to message stream 316. In some implementations, new messages are added to the bottom of message stream 316 so that as a user reads towards the top of message stream 316 the messages become increasingly older. For example, message stream 316 can behave like a typical chat user interface where new messages are posted at the bottom and the older messages scroll up as new messages are added.

In some implementations, a user of WS GUI 300 can add a content item to message stream 316 by selecting graphical element 320. For example, a user can compose a message using graphical element 318 and add a content item to the message by selecting graphical element 320. Upon selection of graphical element 320, a file browser interface can be presented that allows the user to select a content item from the client device's local file system, from the shared folder associated with the workspace and/or from a network resource (e.g., the Internet). When the composed message is displayed in message stream 316, a link to the selected content item and a representation 317 of the selected content item can be displayed in the message. For example, representation 317 can be a preview image of the linked content item. The preview image can be live. For example, the preview image can be updated when the linked content changes or is updated. If the linked content is a content item in the shared folder, the preview image can be updated to reflect changes in the content item. If the linked content is a webpage or other web content, the preview image can be updated to reflect the current state of the webpage or web content. If the content item is not already in the shared folder associated with the workspace, the selected content item can be copied into the local shared folder (e.g., shared folder 214 on client device 210) and WS GUI 300 can trigger (e.g., almost immediately) synchronization of the newly added content item with shared folders 234 and 244, as described above, so that each member of the workspace can access the content item referenced in the new message displayed in message stream 316. If the link is associated with network content (e.g., an Internet web page), then the link can be stored in a "Links" folder of the workspace shared folder.

In some implementations, message stream 316 can include individual messages. For example, message 324 is an individual message from member "Bob." Message 324 can indicate the member who generated the message, the time when the message was generated, how many other members have viewed the message, and the message content (e.g., "something smart about engineering").

In some implementations, message stream 316 can include message thread 326. For example, a message thread is a group of related messages within the message stream. A message thread is typically created when one member replies to a message generated by another user. For example, in message thread 326, Fred posted a message in message stream 316 that includes a content item "media.mp4." Bob replied to Fred's message thereby creating message thread 326. For example, like Bob, member Dave reply to Fred's message by selecting "Reply" graphical element 330 associated with Fred's message and inputting a reply message into a graphical element 332 in message thread 326 to add a message to message thread 326. A message thread can be identified in message stream 316 by a line 328 connecting the messages in the message thread, for example.

In some implementations, message stream 316 can combine chat and threaded message behaviors in the same graphical user interface. For example, when members generate individual messages (e.g., using graphical element 318), message stream 316 can behave like a typical chat user interface where new messages are presented at the bottom of message stream 316 and older messages scroll up. However, when a user interacts with (e.g., hovers a cursor or pointer over, composes a reply to, provides some active or passive input to, etc.) an existing message or an existing message thread (e.g., message thread 326), the message stream 316 will stop the upward scrolling behavior while the user is interacting with the existing message or message thread. Thus, while the user is composing a reply to a message or message thread, the messages in message stream 316 will remain (e.g., freezes) in place. Once the user is no longer interacting with a message or message thread, message stream 316 can resume scrolling messages as new messages are generated in chat like fashion.

In some implementations, a user can like a message displayed in message stream 316. For example, a user can select "Like" graphical element 334 to express approval of a message generated by another member of the workspace presented on WS GUI 300. The members who have liked a message can be indicted using graphical element 336.

In some implementations, WS GUI 300 can include search graphical element 338. For example, a user can enter search terms into graphical element 338 to cause WS GUI 300 to perform a search based on the entered search terms. The search can be a workspace search that searches for content items and messages within the current workspace that match the search terms. The search can include content items, messages, email and other data on the user's local device. The search can be a global search that will search the workspace, the user's local device, content management system 136, and network resources (e.g., the Internet) for content that matches the search terms entered by the user. The search results can be displayed on a graphical user interface (not shown) and the user can select items in the search results to preview the items or add the items to the current workspace.

Figure 4:
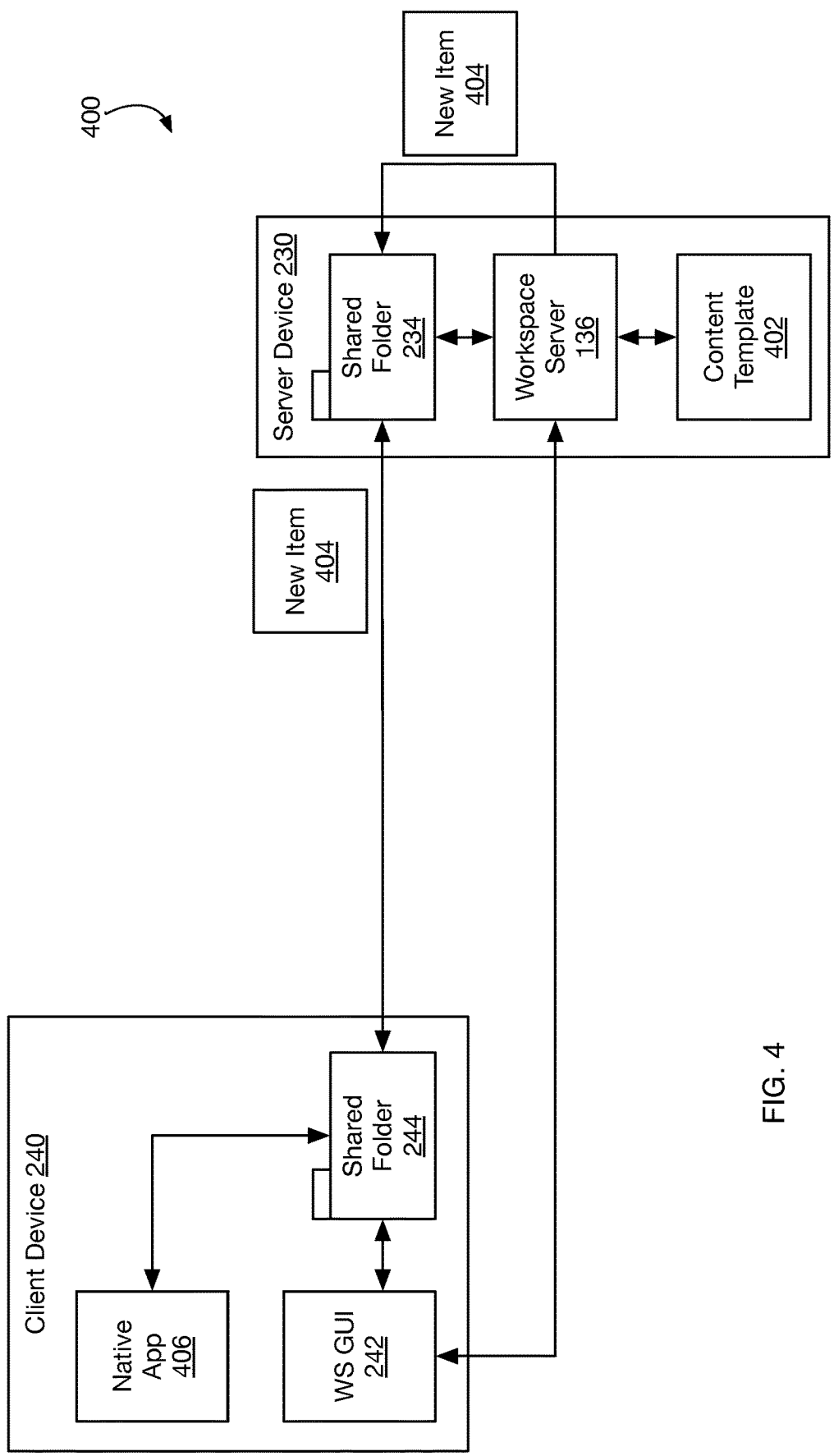
FIG. 4 is a block diagram of an example system for creating a new content item in a workspace.

FIG. 4 is a block diagram of an example system 400 for creating a new content item in a workspace. For example, a new content item can be generated in response to a user selecting a graphical element 312 on WS GUI 300 (e.g., WS GUI 242). In some implementations, a user of WS GUI 242 can provide input to GUI 242 to generate a new content item. For example, the content item can be a productivity item such as a word processor document, a spreadsheet, or a presentation document, among other things. In response to receiving the input, WS GUI 242 can display a prompt asking the user to select a type of content item to generate and to provide a name for the new content item. Once the user selects a content item type and specifies a name for the content item, WS GUI 242 can send the content item type and specified name to workspace server 136. Upon receiving the content item type and specified name, workspace server 136 can select a content template 402 corresponding to the content item type (e.g., if the content item type is a word processing document, then a word processing template can be selected). Workspace server 136 can copy the selected content template 402 and rename the content template according to the specified name to generate new content item 404. Workspace server 136 can store new content item 404 in shared folder 234. Once new content item 404 is stored in shared folder 234, workspace server 136 can trigger synchronization of shared folder 234 with shared folder 244 on client device 240 so that new content item 404 can be immediately (e.g., almost immediately) synchronized with the corresponding shared folder 244 on client device 240. The synchronization will cause new content item 404 to be sent to client device 240 (and client devices of other workspace members) and stored in shared folder 244. Once new content item 404 is stored in shared folder 234 and/or shared folder 244, workspace server 136 can notify WS GUI 242 that new content item 404 is available for viewing and/or editing.

In some implementations, a user can view new content item 404 through a web browser. For example, once WS GUI 242 is notified that new content item 404 is available in shared folder 234 on server device 230, WS GUI 242 can present new content item 404 in the browser interface.

In some implementations, a user can view new content item 404 in a native application on client device 240. For example, once WS GUI 242 is notified that new content item 404 is available in shared folder 244 on client device 240, WS GUI 242 can prompt the user for input specifying how new content item 404 should be displayed (e.g., in the browser or in native application 406). In some implementations, the user can specify native application 406 for displaying new content item 404. For example, if new content item 404 is a word processing document, native application 406 can be a word processing application installed on client device 240 and appropriate for presenting and editing the word processing document on client device 240. Thus, the user can view and edit new content item 404 using a native application executing locally on client device 240. Similarly, when the user selects a content item represented by graphical elements 310 on WS GUI 300, the user can be given the option to open the selected content item in the web browser or in a native application.

Figure 5:
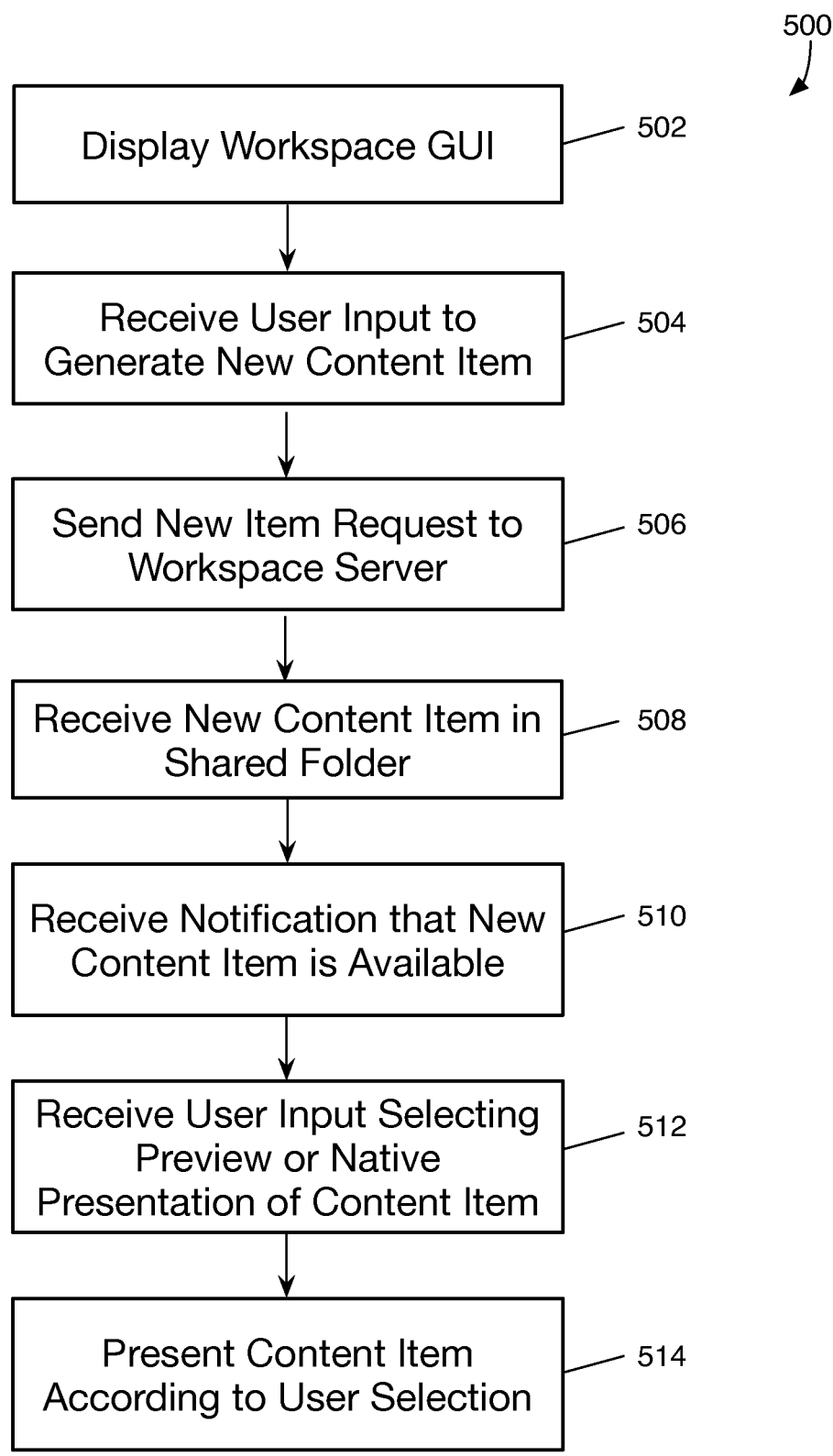
FIG. 5 is a flow diagram of an example client process for generating a new content item in a workspace.

FIG. 5 is a flow diagram of an example client process 500 for generating a new content item in a workspace. At step 520, client device 240 can display workspace graphical user interface 300. For example, WS GUI 300 (i.e., WS GUI 242) can present a graphical element 312 for generating a new content item in the workspace.

At step 504, client device 240 can receive user input to generate a new content item. For example, WS GUI 300 can receive user input selecting graphical element 312. In response to the user's selection of graphical element 321, WS GUI 300 can present a prompt requesting that the user select a content item type and specify a name for the new content item. WS GUI 300 can receive user input specifying the content item type and the name for the new content item.

At step 506, client device 240 can send a new content item request to workspace server 136. For example, client device 240 can send the user-specified content item type and name to workspace server 136.

At step 508, client device 240 can receive a new content item in local shared folder 244 on client device 240. For example, content management system 106 can synchronize shared folder 244 on client device 240 with shared folder 234 on server device 230 to deliver the new content item from server device 230 to client device 240, as described above.

At step 510, client device 240 can receive a notification that indicates that the new content item is available for viewing in the workspace. For example, WS GUI 300 can receive a notification from workspace server 136 that the new content item is available in workspace shared folder 234. WS GUI 300 can receive a notification from workspace server 136 that the new content item has been synchronized with shared folder 244 on client device 240. Alternatively, WS GUI 300 can detect the presence of the new content item in local shared folder 244. For example, WS GUI 300 can monitor shared folder 244 for changes, such as the addition of the new content item.

At step 512, client device 240 can receive user input selecting a preview image or native application presentation of the new content item. For example, once WS GUI 300 receives a notification that the new content item is available in the workspace, WS GUI 300 can present a prompt asking the user how the user would like to view the new content item. The prompt can present options for viewing a preview image of the new content item or opening and viewing the new content item in a native application on client device 240.

At step 514, client device 240 can present the new content item according to the user's selection. For example, if the user selects to view a preview image, workspace server 136 can deliver a preview image of the new content item stored in shared folder 234 to WS GUI 300 for presentation to the user on client device 240. If the user selects to view the content item in a native application, WS GUI 300 can invoke a native application appropriate for the type of the new content item on client device 240. For example, if the new content item type is a spreadsheet, then WS GUI 300 can invoke a spreadsheet application on client device 240 for displaying the new content item stored in shared folder 244 on client device 240. For example, WS GUI 300 can present the preview image and native application viewing options to a user anytime the user selects to open or view a content item within a workspace.

Figure 6:
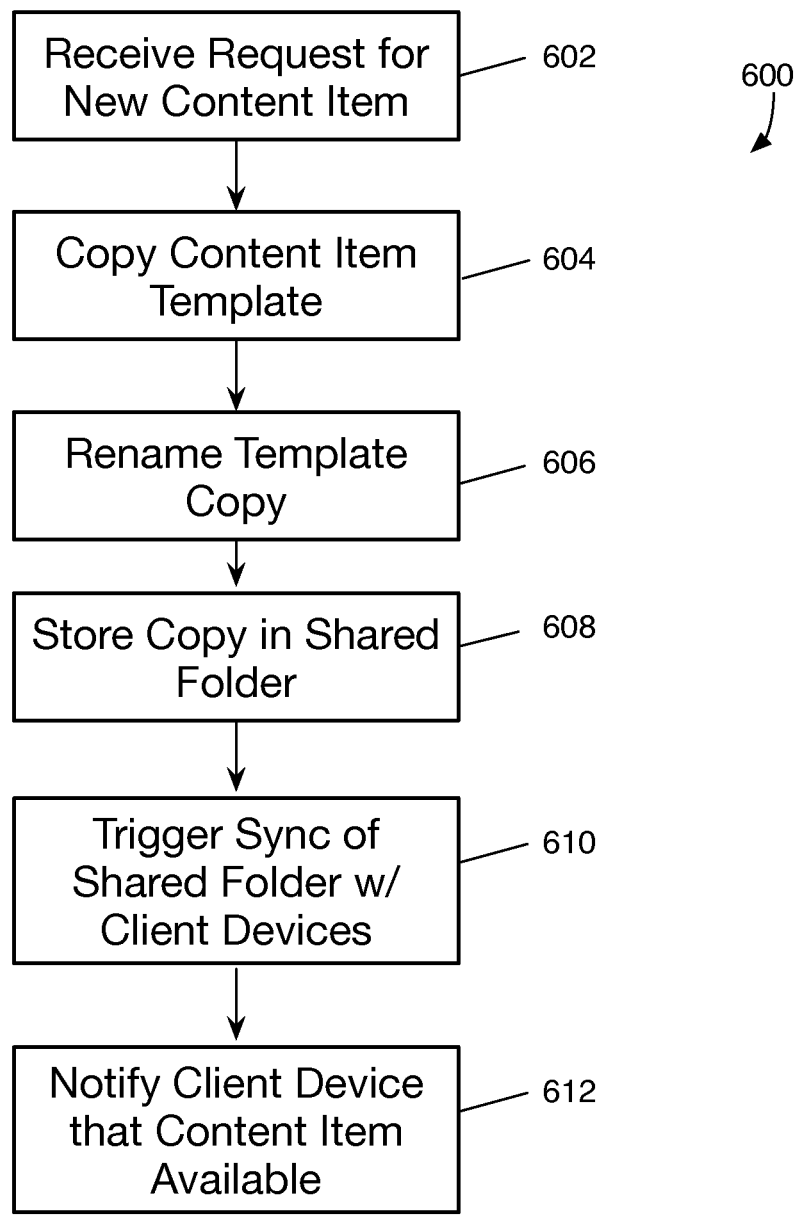
FIG. 6 is a flow diagram of an example server process for generating a new content item in a workspace.

FIG. 6 is a flow diagram of an example server process 600 for generating a new content item in a workspace. At step

602, server device 230 can receive a request for a new content item. For example, workspace server 136 can receive a request form WS GUI 300 to create a new content item. The request can identify the type of content item to generate and a name for the new content item.

At step 604, server device 230 can generate a copy of an existing content item template. For example, server device 230 can store templates for each type of content item that can be generated by workspace server 136. Workspace server 136 can determine from which template to generate the new content item based on the content item type in the request received at step 602. Workspace server 136 can select a content item template based on the requested content item type and copy the content item template to make a new content item.

At step 606, server device 230 can rename the copy of the content item template according to the name specified in the request received at step 602. For example, workspace server 136 can assign to the new content item the content item name specified in the request received at step 602.

At step 608, server device 230 can store the template copy in shared folder 234 on server device 230. For example, workspace server 136 can store the new content item in shared folder 234.

At step 610, server device 230 can trigger synchronization of shared folder 234 on server device 230 and shared folder 244 on client device 240. For example, upon storing the new content item in shared folder 234, workspace server 136 can command content management system 106 to synchronize shared folder 244 and shared folder 234 so that the client devices associated with the workspace can be updated with the new content item. By triggering the synchronization upon creating and storing the new content item, client devices (e.g., users) can have near immediate access to the newly generated content item.

At step 612, server device 230 can notify client device 240 that the new content item is available. For example, workspace server 136 can notify WS GUI 300 that the new content item is available in shared folder 234 on server 230. Upon synchronization of shared folder 244 on client device 240 with shared folder 234 on server device 230, workspace server 136 can notify WS GUI 300 that the new content item is available locally on client device 240. Thus, client device 240 can open and display the new content item to the user in a native application associated with the new content item type.

Figure 7:
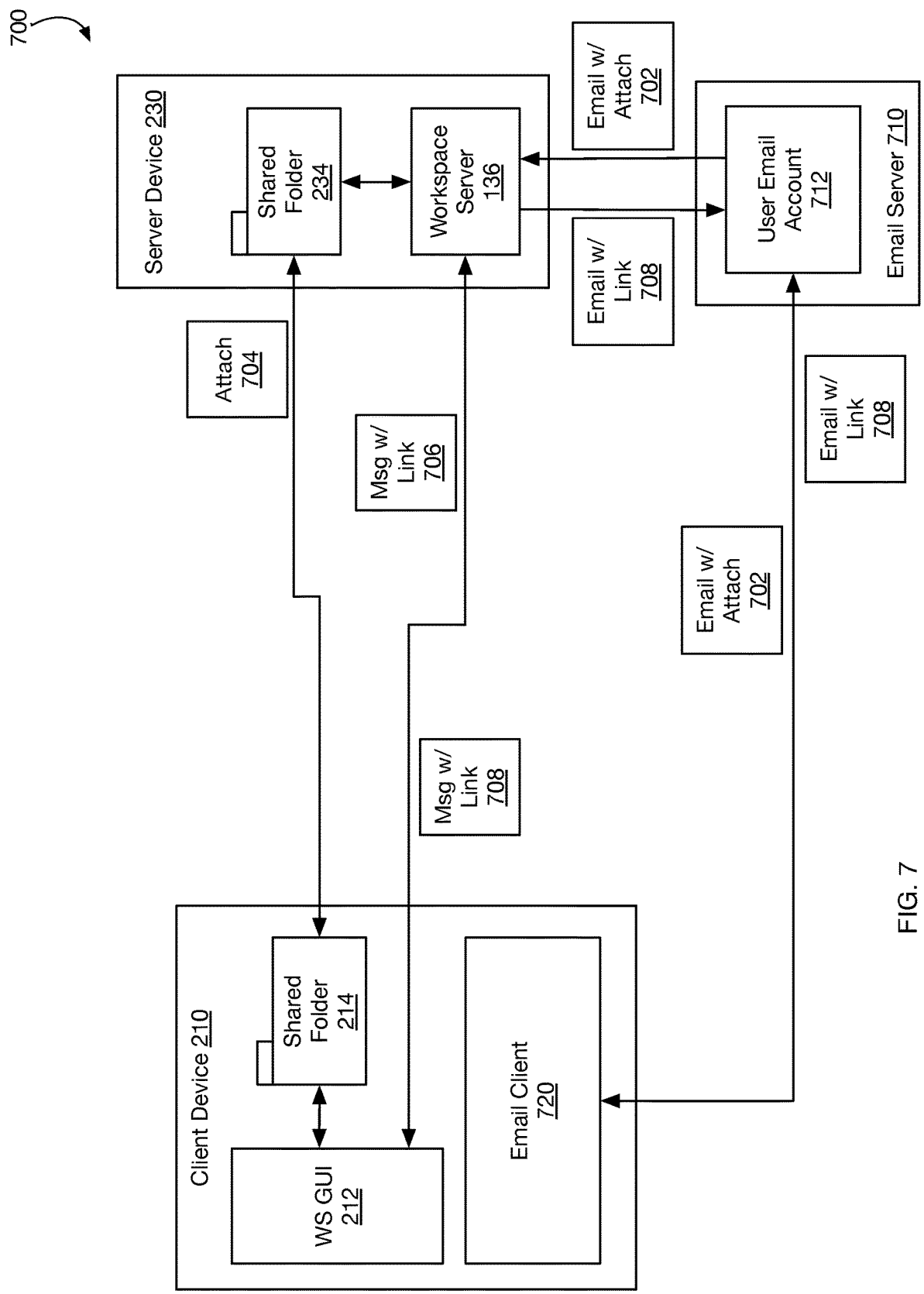
FIG. 7 illustrates a block diagram of a system for integrating email into a shared folder backed integrated workspace.

FIG. 7 illustrates a block diagram of a system 700 for integrating email into a shared folder backed integrated workspace. For example, system 700 allows users to integrate existing email systems into the shared folder backed integrated workspace and present emails as workspace messages in message stream 316 of WS GUI 300.

In some implementations, workspace server 136 can convert email messages into workspace messages. For example, a user (e.g., workspace member) can, e.g., through WS GUI 300, grant workspace server 136 access to an email account 712 of the user on email server 710. The user can provide workspace server 136 with an account identifier (e.g., email address) and credentials (e.g., user name, password). Workspace server 136 can use the account identifier and credentials to access the user's email account.

In some implementations, workspace server 136 can analyze emails in the user's email account 712 to determine which emails are workspace-related. For example, a workspace can be associated with an email mailing list (e.g., an email address that can be used to send and receive emails to/from members of a group), as described above. Workspace server 136 can determine which emails in the user's email account 712 are associated with the mailing list (e.g., addressed to or from the email address for the mailing list). Workspace server 136 can convert the emails associated with the mailing list into workspace messages and add the workspace messages to the workspace (e.g., to shared folder 234) so that the messages are displayed on WS GUI 300. For example, workspace server 136 can extract the content of an email and insert the content of the email into a workspace message object for display on WS GUI 300.

In some implementations, workspace server 136 can store email attachments in shared folder 234. For example, user email account 712 can receive an email from a workspace mailing list that includes an attachment (e.g., content item, media file, etc.). Email server 710 can send the email with attachment 702 to email client 720 for presentation to a user of client device 210. Workspace server 136 can obtain email with attachment 702 from user email account 712. For example, because email 702 is associated with the workspace mailing list (e.g., email 702 was received from the mailing list), workspace server 136 will obtain email 702 from user email account 712.

Once workspace server 136 obtains email 702, workspace server 136 will store email attachment 704 in shared folder 234 and generate workspace message 706 that includes the contents of email 702 and a link to email attachment 704 in shared folder 234. Workspace server 136 can then trigger synchronization of shared folders 234 and 214 so that shared folder 214 can obtain a copy of email attachment 704. Workspace server 136 can send workspace message 706 to WS GUI 212 so that the message and the link to attachment 704 can be displayed in message stream 316. For example, workspace message 706 displayed in workspace stream 316 can include the contents of email 702, a link to attachment 704 stored in shared folder 234, and an embedded preview image of the attachment. In some implementations, the contents (e.g., the body, the textual message portion) of email 702 can be tracked or associated with attachment 704 (e.g., content item) as comments on attachment 704. When attachment 704 is later opened and viewed by the user, the comments (e.g., email message) can be presented to the user, as described further below.

In some implementations, workspace server 136 can convert workspace messages into email messages. For example, a user can generate a new workspace message using graphical element 318 of WS GUI 300 and add a content item to the message using graphical element 320, as described above. The workspace message can include a link to the content item, for example. The new workspace message 708 can be sent from WS GUI 300 (i.e., WS GUI 212) to workspace server 136. Workspace server 136 can generate a new email that includes the contents of the workspace message, including the link to the content item in shared folder 214, and send the new email to the email mail list associated with the workspace. Because the user is associated with the mail list, the new email with the link to the content item will be delivered to the user email account 712 and ultimately delivered to email client 720.

For example, by sending links in emails instead of attaching content items to emails, the amount of storage needed to store emails can be reduced. Additionally, users no longer need to worry about attachment size limits when using links to content items in shared folders rather than attaching large files. Further, users can use the links in emails to obtain the latest version of a content item instead of only having access to a static, outdated version of the content item.

In some implementations, links allow workspace owners/administrators/users to have more control over access to content items. For example, a user can disable a link when the user no longer wishes others to have access to a content item. The user can specify expiration dates for links. The user can restrict access to links to specified users or specified client devices.

In some implementations, the user can specify options for when to generate emails from workspace messages. For example, a user (e.g., workspace member) can specify that the user should only receive emails about initial workspace messages (e.g., individual message or first messages in a message thread). The user can specify that the user should only receive emails about messages in which the user is mentioned (e.g., @mentioned, @Bob, @Steve, etc.). The user can specify that the user should only receive emails about messages when another workspace member "likes" a workspace message originated by the user. Thus, the user can avoid being overwhelmed by workspace emails generated for every new workspace message in the workspace.

Figure 8:
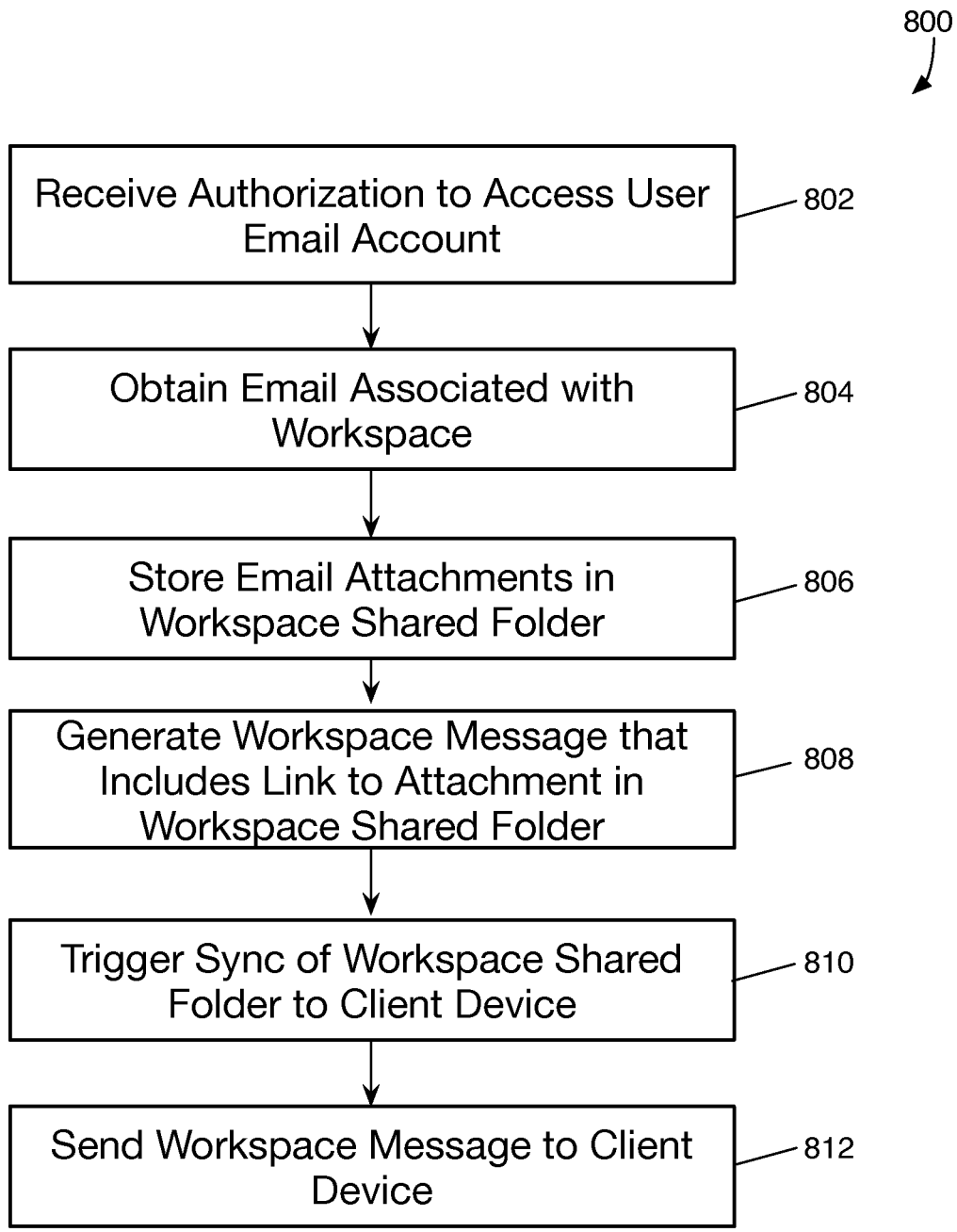
FIG. 8 is a flow diagram of an example server process for converting an email into a workspace message.

FIG. 8 is a flow diagram of an example server process 800 for converting an email into a workspace message. At step 802, server device 230 can receive authorization to access a user email account. For example, a user (e.g., workspace member) can provide input to WS GUI 300 authorize workspace server 136 to access an email account associated with the user. The user can provide input to WS GUI 300 identifying an email account (e.g., email address) and credentials (e.g., user name and password) for the email account. WS GUI 300 can send the email account identifier and credentials to workspace server 136.

At step 804, server device 230 can obtain email associated with the workspace from the user's email account. For example, the workspace can have an email address. The email address can be a mailing list address used to send and receive emails from members of the workspace. Workspace server 136 can use the email account identifier and credentials supplied by the user to access the user's email account. Workspace server 136 can analyze the emails in the user's email account to determine which emails are associated with the workspace email address. Workspace server 136 can obtain copies of each email that is associated with the workspace email address.

At step 806, server device 230 can store email attachments in the workspace shared folder. For example, workspace server 136 can determine which emails obtained from the user's email account have attachments. If an email does not have an attachment, then the method can progress to step 808. If an email does have an attachment, then the attachment can be stored in the shared folder associated with the workspace.

At step 808, server device 230 can generate a workspace message that includes a link to the attachment stored in the workspace's shared folder. For example, workspace server 136 can extract the body (e.g., textual content) of the email from the email and generate a new workspace message based on the content of the email. If the email has an attachment, a link to the attachment stored in the workspace's shared folder can be generated and inserted in to the new workspace message.

At step 810, server device 230 can trigger synchronization of the server shared folder with corresponding shared folders on client devices. For example, workspace server 136 can send a command to content management system 106 to cause content in the shared folders 234, 244 and 214 of the workspace to be synchronized. Thus, each shared folder 234, 244 and 214 in the workspace can be updated to include the email attachment stored in the workspace shared folder.

At step 812, server device 230 can send the new workspace message to client devices 210 and 240. For example, workspace server 136 can send the new workspace message (e.g., with link to stored attachment) to WS GUI 300 on each client device. WS GUI 300 can display the workspace message and/or the link to the stored attachment in message stream 316, for example. The workspace message can include a live preview image of the linked content, as described above.

Figure 9:
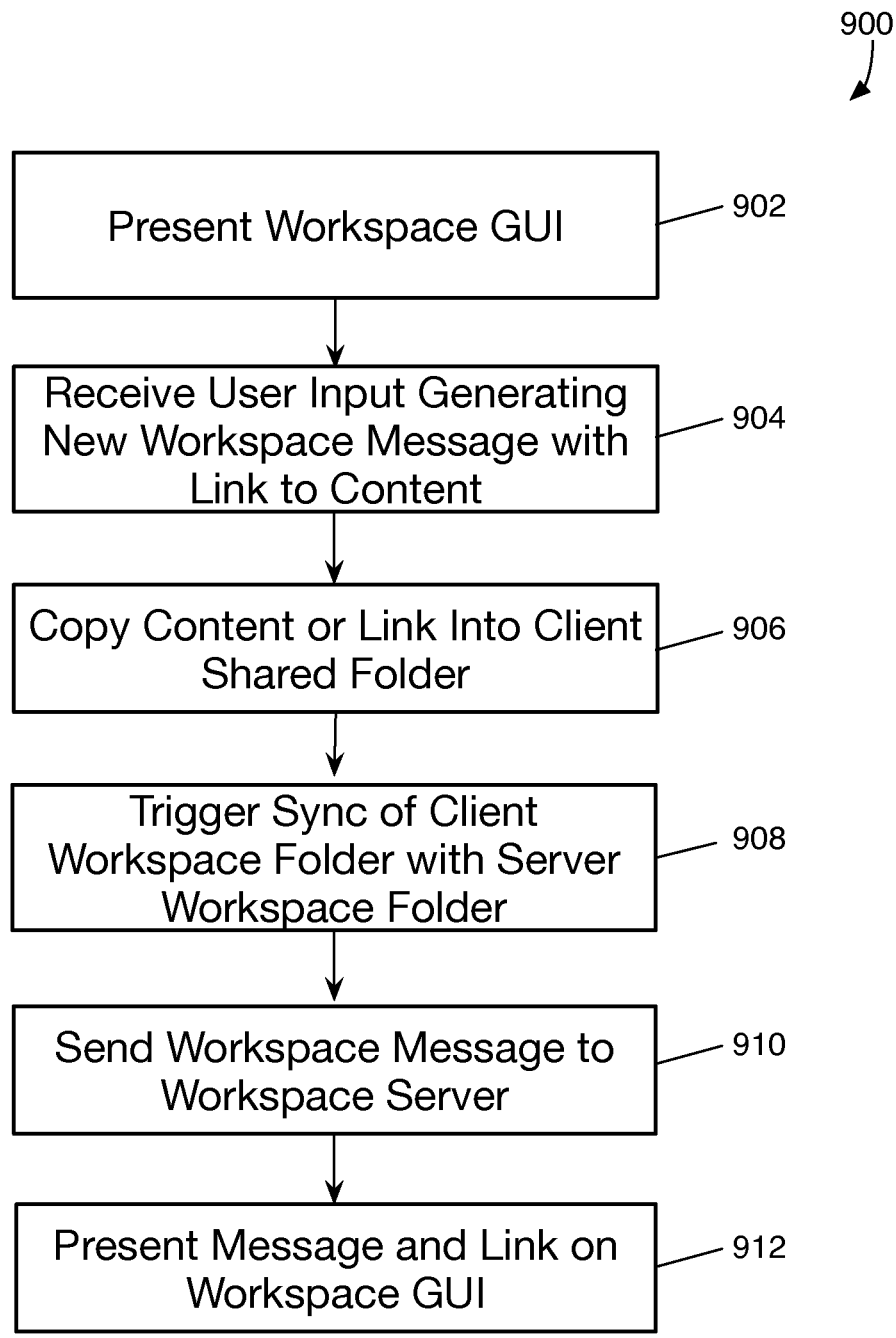
FIG. 9 is a flow diagram of an example client process for converting a workspace message into email messages.

FIG. 9 is a flow diagram of an example client process 900 for converting a workspace message into email messages. At step 902, client device 210 can present WS GUI 300 (i.e., WS GUI 212) to a user.

At step 904, client device 210 can receive user input generating a new workspace message with a link to content. For example, WS GUI 300 can receive user input to generate a new workspace message and link a content item to the workspace message, as described above with reference to FIG. 3.

At step 906, client device 210 can copy the linked content or the link into the shared folder of client device 210. For example, WS GUI 300 can copy the linked content or the link into the workspace shared folder on client device 210.

At step 908, client device 210 can trigger synchronization of shared folder 214 of client device 210 with shared folder 234 of server device 230. For example, WS GUI 300 can send a message to workspace server 136 to trigger synchronization of shared folder 214 and shared folder 234. Upon receiving the synchronization request, workspace server 136 can send a command to content management system 106 to cause content management system 106 to synchronize the shared folders. By triggering a synchronization of the shared folders, WS GUI 300 can ensure that the linked content item will be available to the recipient of the email generated at step 912 below.

At step 910, client device 210 can send the workspace message to workspace server 136. For example, WS GUI 300 can send the workspace message to workspace server 136.

At step 912, client device 210 can present the workspace message and link on WS GUI 300, as described above.

Figure 10:
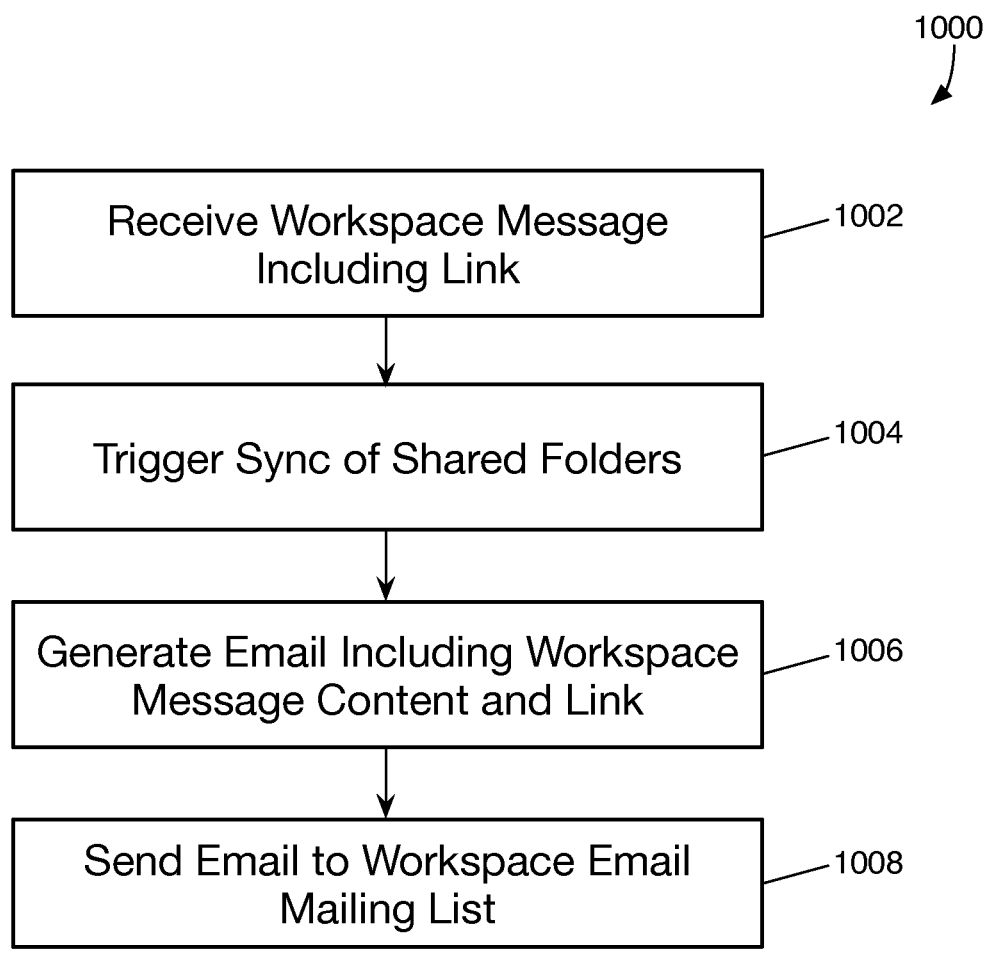
FIG. 10 is a flow diagram of an example server process for converting a workspace message into an email.

FIG. 10 is a flow diagram of an example server process 1000 for converting a workspace message into an email. At step 1002, server device 230 can receive a workspace message including a link to content from client device 210. For example, WS GUI 300 can generate the workspace message in response to user input, as described above. WS GUI 300 can send the workspace message to workspace server 136. The link can be a link to a content item in a shared folder associated with the workspace in content management system 106. The link can be a link to external content, such as an Internet web page.

At step 1004, server device 230 can trigger synchronization of shared folder 234 of server device 230 and shared folder 210 of client device 210. For example, if the workspace message includes a link to a content item in shared folder 214, workspace server can determine whether the linked content item exists in shared folder 234. If the linked content item does not exist in shared folder 234 on server device 230, then workspace server 136 can trigger synchronization of shared folder 234 and shared folder 214 so that shared folder 234 will include the linked content item already stored in shared folder 214 of client device 210. In some implementations, either step 908 of process 900 or step 1004 of process 1000 will be performed. Step 908 and step 1004 both provide for synchronizing shared folders when a workspace message that links content is to be converted into an email. However, only one of the steps 908 or 1004 are necessary to ensure that the linked content is available in shared folder 234 on server device 230 (and other shared folders on other client devices).

At step 1006, server device 230 can generate an email including the workspace message content and the link. For example, workspace server 136 can generate an email that includes the content of the workspace message and the link to the linked content.

At step 1008, server device 230 can send the generated email to the workspace mailing list. For example, workspace server 136 can send the email generated based on the workspace message to the workspace mailing list so that members of the workspace can receive the workspace message as an email. The email can be delivered to the members of the workspace mailing list according to each member's preferences, as described above.

In some implementations, workspace server 136 can send workspace messages to external users who are not members of a workspace. For example, a workspace member can generate a workspace message, as described above, and mention an external user. For example, the external user can be at-mentioned (e.g., @Sue) in a workspace message. If the mentioned external user is not one of the members of the workspace, workspace server 136 can access the email accounts of the members of the workspace to obtain contact information (e.g., email address, telephone number, etc.) for the mentioned external user. If workspace server 136 is unable to locate contact information for the mentioned external user, workspace server 136 can send a message to WS GUI 300 to cause WS GUI 300 to prompt the workspace member for contact information for the external user mentioned in the workspace message. The workspace member can input contact information (e.g., email address, telephone number, etc.) into WS GUI 300. WS GUI 300 can send the contact information to workspace server 136. Workspace server 136 can send the workspace message in which the external user was mentioned to the external user using the contact information provided by the workspace member. For example, workspace server can send the external user an email or text message (e.g., SMS) that includes the content of the workspace message in which the external user was mentioned. If the workspace message includes a link to content, the external user can access the content (e.g., through a web browser) even though the external user is not a member of the workspace.

In some implementations, an external user can add a workspace message to message stream 316. For example, the external user can reply to an email or text message generated by workspace server 136. Workspace server 136 can convert the email or text message reply into a workspace message and post the workspace message in message stream 316.

Figure 11:
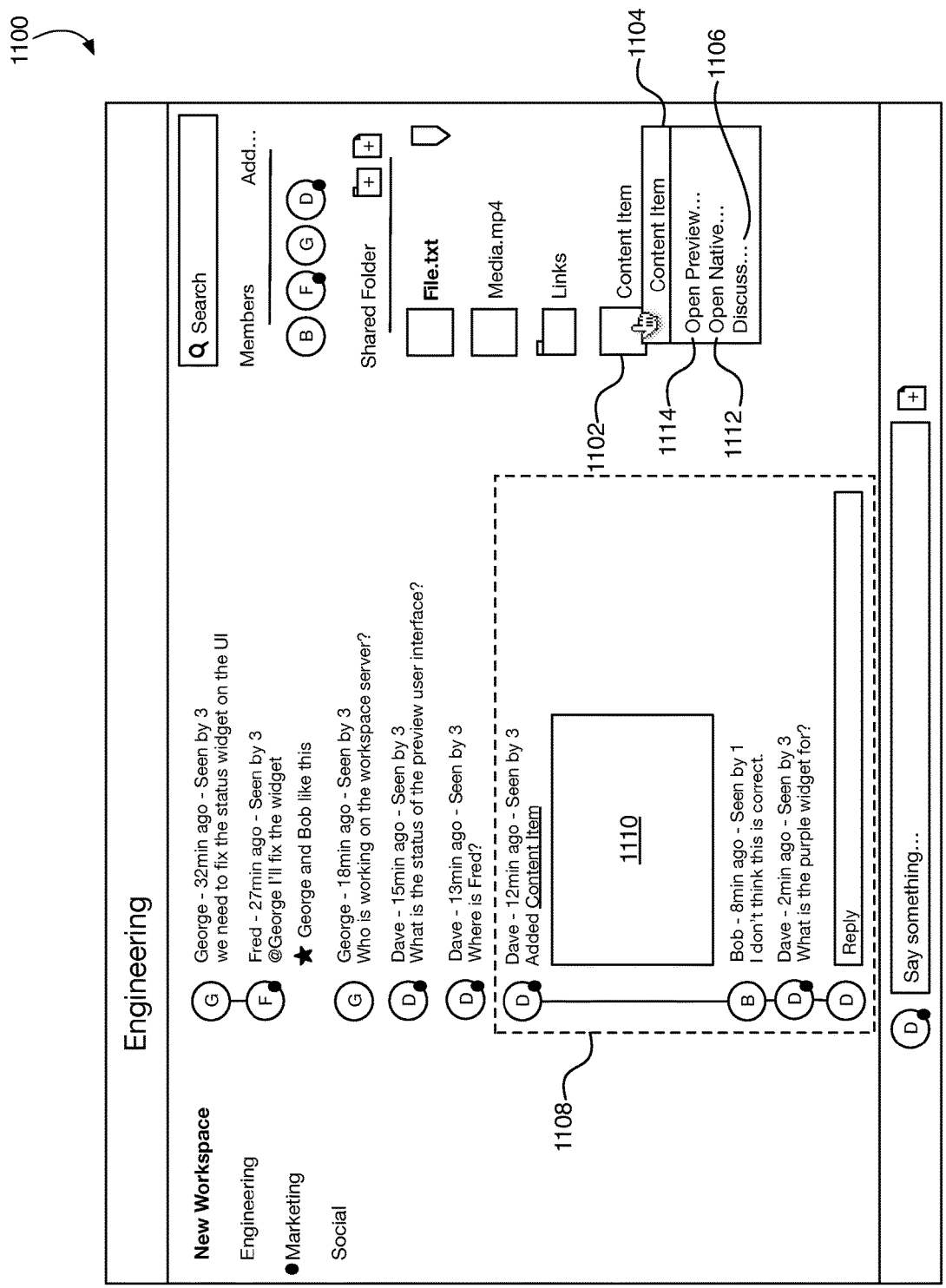
FIG. 11 illustrates an example workspace graphical user interface for generating a discussion about a content item.

FIG. 11 illustrates an example workspace graphical user interface (WS GUI) 1100 for generating a discussion about a content item. For example, WS GUI 1100 can present a graphical element 1102 representing a content item stored in the shared folder of the displayed workspace. In some implementations, a user can select graphical element 1102 to cause graphical element 1104 (e.g., options menu) to appear on WS GUI 1100. Graphical element 1104 can present options with respect to the content item corresponding to the selected graphical element 1102. For example, graphical element 1104 can present a discussion option 1106 that allows a user to initiate a discussion of the content item corresponding to graphical element 1102.

In some implementations, a new message thread can be generated to discuss a selected content item. For example, in response to the user selecting discussion option 1106, message thread 1108 can be created in the message stream displayed on WS GUI 1100. As can be seen in FIG. 11, workspace member Dave started the discussion thread for "Content Item." Preview image 1110 corresponding to the content item is displayed in message thread 1108 proximate to Dave's initial message. Subsequently, Bob and Dave have added workspace messages to message thread 1108 discussing the content item. While the example discussion described above occurs inline with other messages in the message stream, a separate user interface can be presented to discuss the content item.

For example, user interface 1200 of FIG. 12 below can be presented to facilitate discussion of the selected content item.

In some implementations, graphical element 1104 can include options for opening the content item corresponding to graphical element 1102. For example, the options for opening a content item can include a selectable option 1114 for opening a preview image of the content item, as described above. The options for opening a content item can include a selectable option 1112 for opening the content item in a native application running on the user's client device, as described above. Upon receiving a user selection of either option 1112 or option 1114, WS GUI 300 will cause the corresponding content item to be displayed in either the native application or a preview image, as described above.

Figure 12:
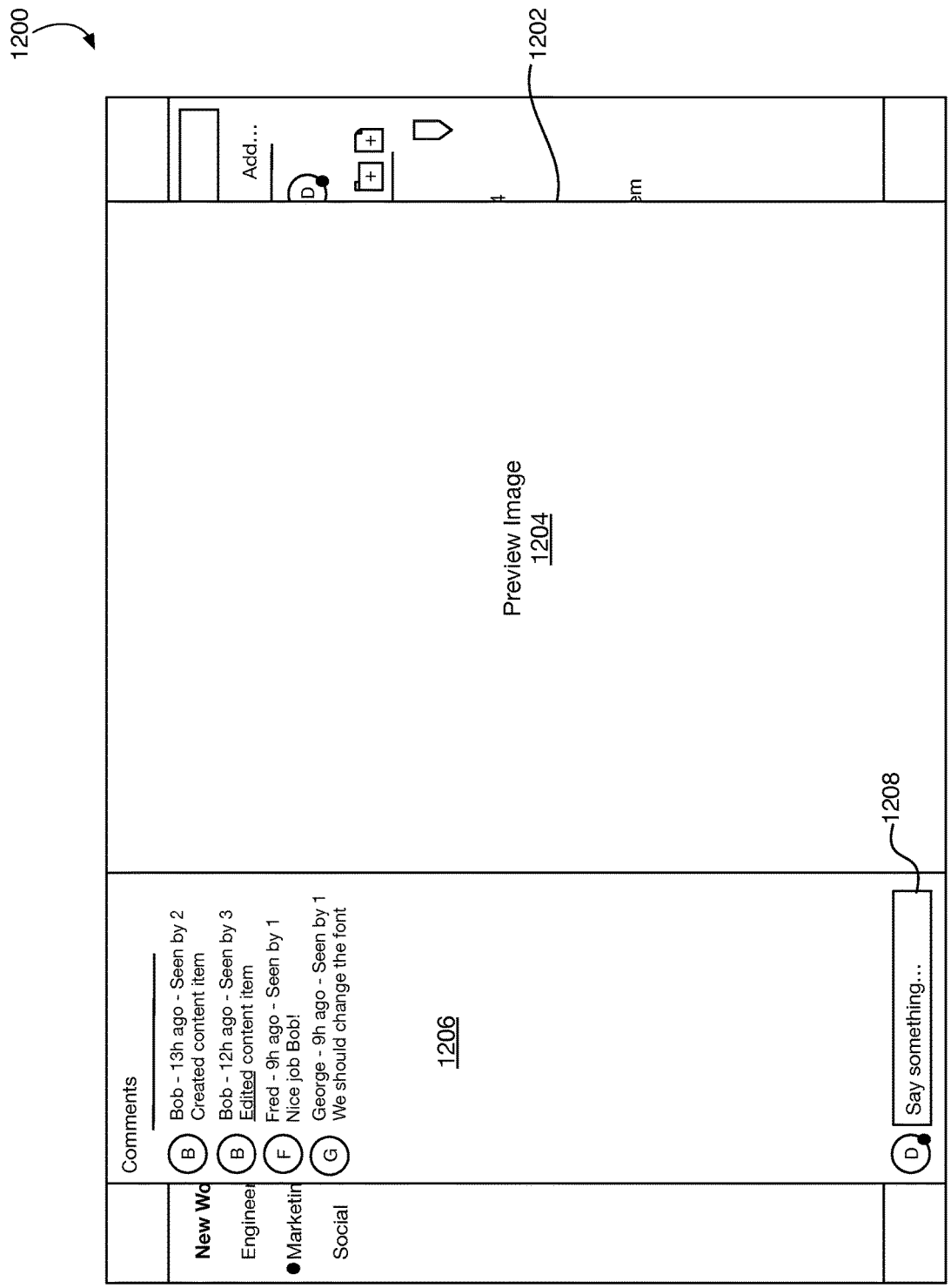
FIG. 12 illustrates an example workspace graphical user interface for viewing comments related to a content item in a workspace.

FIG. 12 illustrates an example workspace graphical user interface (WS GUI) 1200 for viewing comments related to a content item in a workspace. For example, WS GUI 1200 can be invoked when a user selects discuss option 1106 or open preview option 1114 of WS GUI 1100. In some implementations, WS GUI 1200 can include graphical element 1202 (e.g., a window) for viewing a preview image 1204 of the selected content item and comments 1206 associated with the selected content item. In some implementations, the user can edit preview image 1204. In some implementations, preview image 1204 is a read only image.

In some implementations, comments 1206 can present comments associated with the selected content item collected from a variety of sources. For example, workspace server 136 can collect comments related to a selected content item from all available sources and send the collected comments to WS GUI 1200 for display in comments area 1206. For example, comments 1206 can include comments made about the selected content item in message stream 316. Comments 1206 can include comments made about the selected content item made in workspace member emails. Comments 1206 can include comments obtained from within the selected content item. For example, some word processing applications allow users to generate comments and track changes inside a document. These internal comments and modifications can be extracted from the document and presented in comments 1206. In some implementations, comments 1206 can include change information, such as identifying when a content item was created, modified, etc. Comments 1206 can identify what changes were made to the selected content item.

In some implementations, graphical element 1202 can include graphical element 1208 for facilitating conversations about the currently displayed content item. For example, a user can input a comment into graphical element 1208 and submit the comment to cause the comment to appear in comment area 1206. Each user can comment on and discuss the currently displayed content item using graphical element 1208 and comments are 1206.

In some implementations, comments collected by workspace server 136 can be added to the corresponding content item. For example, if the content item is a word processing document that supports internal comments, the comments collected from the variety of sources by workspace server 136 can be added to the word processing document as internal comments.

Figure 13:
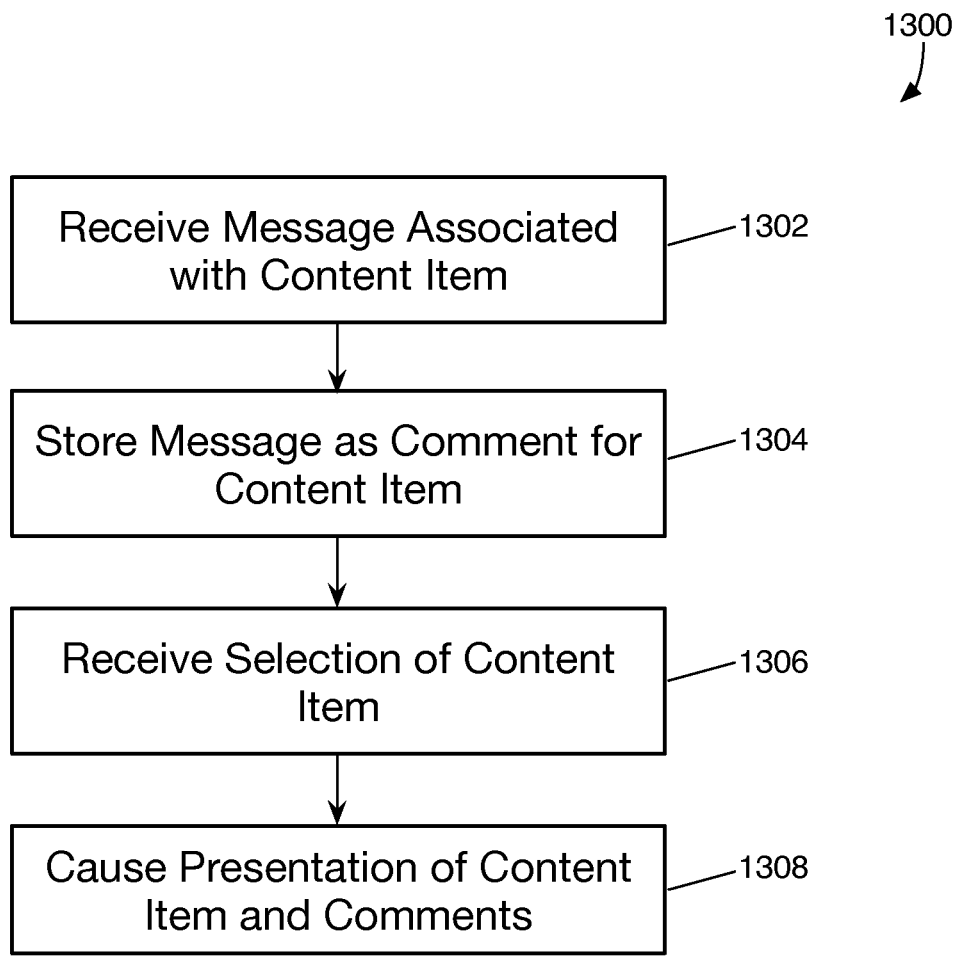
FIG. 13 is a flow diagram of an example process for generating and displaying comments for a content item.

FIG. 13 is a flow diagram of an example process 1300 for generating and displaying comments for a content item. At step 1302, workspace server 136 can receive a message associated with a content item. For example, workspace server 136 can determine that a message is associated with (or related to) the content item when the content item is attached to the message (e.g., an email attachment). Workspace server 136 can determine that a message is associated with the content item when the content item is linked to the message (e.g., a link to the content item in an email, a link to the content item in workspace message, a link to the content item in a chat message, etc.). Workspace server 136 can determine that the message is associated with the content item when the message is in reply to a previous message that has the content item as an attachment or has a link to the content item. Workspace server 136 can determine that the message is associated with the content item when the message is in a message thread (e.g., a series of related messages, a series of replies to an original message, etc.) that contains a previous message that has the content item as an attachment or has a link to the content item.

At step 1304, workspace server 136 can store the message as a comment for the content item. For example, when workspace server 136 determines that a message is associated with a content item, workspace server 136 can store the message in comment metadata corresponding to the content item. Thus, messages from various sources (e.g., email, chat, workspace message, instant message, text message, etc.) can be aggregated into the comment metadata for the content item. For example, the comment metadata can be stored internally to the content item. The comment metadata can be stored separately from the content item (e.g., in a separate file). All of the comments obtained for the content item regardless of source (e.g., email, chat message, workspace message, text message, instant message, comments from within the content item, etc.) can be stored in the comment metadata for the content item.

At step 1306, workspace server 136 can receive a selection of the content item. For example, a user of client device 102$_i$ can view a representation of the content item (e.g., an icon, graphic, text, etc., that represents the content item) on a workspace graphical user interface. For example, the workspace graphical user interface can be a web interface displayed in a browser application. The workspace graphical user interface can be a user interface of a workspace specific native application. The user can select the representation of the content item displayed on the workspace graphical user interface to select the content item. The workspace graphical user interface can send the content item selection to workspace server 136.

At step 1308, workspace server 136 can cause client device 102$_i$ to present the selected content item and the comments for the content item. For example, workspace server 136 can send a webpage that displays the content item (or preview image of the content item) and the comments for the content item to the web browser running on client device 102$_i$. Workspace server 136 can send the content item and the content item comments to the native application running on client device 102$_i$. For example, workspace server 136 can synchronize the content item and the content item comments metadata with the client device as described above. The content item and the comments can be displayed in a separate user interface (e.g., WS GUI 1200). The content item can the comments can be displayed in a content item-specific message thread (e.g., message thread 1108 of FIG. 11).

Figure 14:
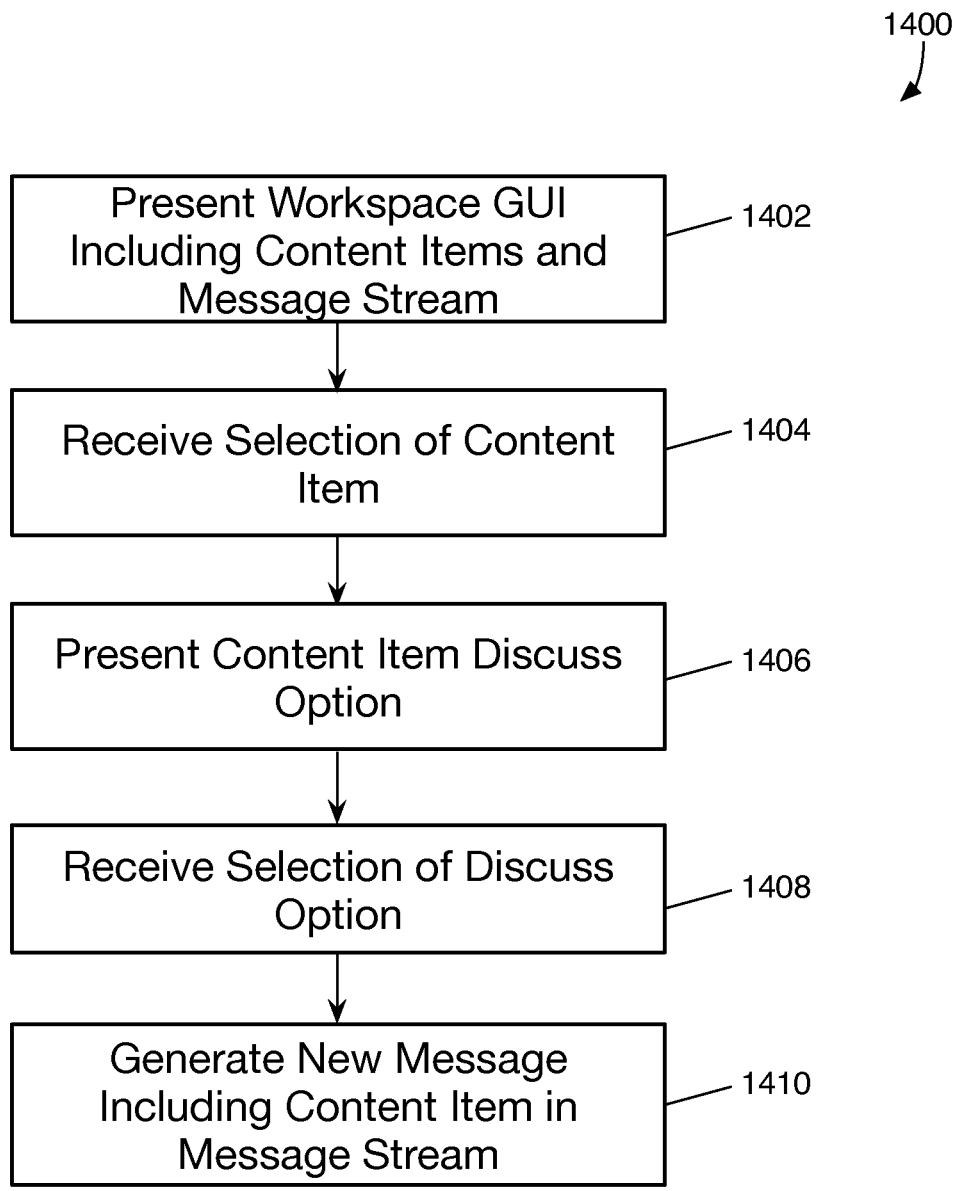
FIG. 14 is a flow diagram of an example process 1400 for creating conversations around a content item.

FIG. 14 is a flow diagram of an example process 1400 for creating conversations around a content item. At step 1402, a client device can present a workspace GUI including content items and a message stream. For example, client device 102$_i$ can present WS GUI 1100 of FIG. 11.

At step 1404, the client device can receive a selection of a content item displayed on the workspace GUI. For example, a user of client device 102$_i$ can provide input to WS GUI 1100 to select content item 1102 of FIG. 11.

At step 1406, the client device can present a content item discussion option. For example, WS GUI 1100 can present options menu 1104 that includes discussion option 1106 in response to the user input received at step 1404.

At step 1408, the client device can receive a selection of the discuss option. For example, the user of client device 102$_i$ can provide input to client device 102$_i$ with respect to discussion option 1106 to select the discussion option.

At step 1410, the client device can generate a new message including the selected content item in the message stream. For example, in response to receiving the selection of the discussion option 1106, client device 102$_i$ can generate a new message for the message stream that includes the selected content item. Client device 102$_i$ can send the new message to workspace server 136 and present the new message and the selected content item in the message stream. Once the new message is presented to other workspace members, the workspace members can reply to the message to continue the discussion of the selected content item and generate message thread 1108 of FIG. 11.

Figure 15:
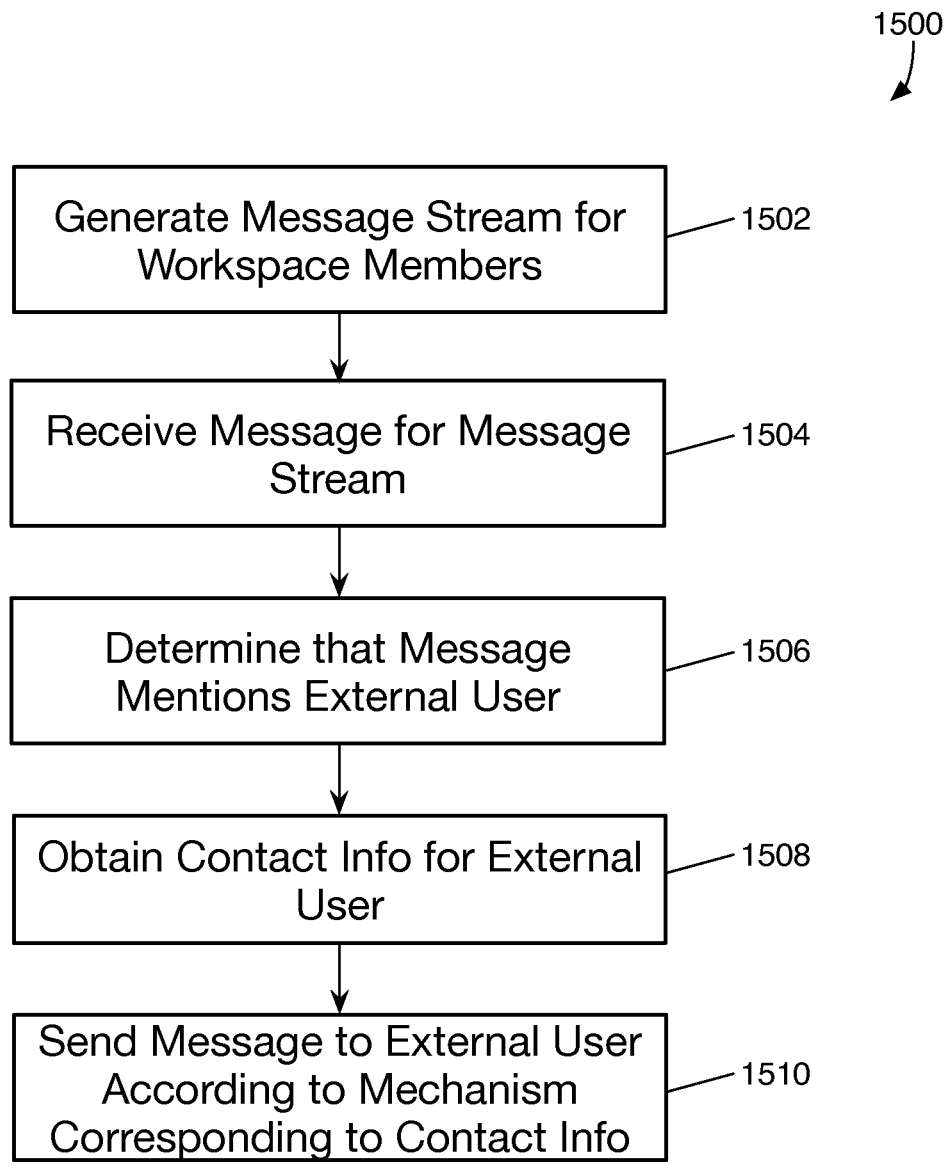
FIG. 15 is a flow diagram of an example process 1500 for sending workspace messages to external users.

FIG. 15 is a flow diagram of an example process 1500 for sending workspace messages to external users. At step 1502, a server device can generate a message stream for workspace members. For example, server device 230 can generate message stream 316 of FIG. 3. Message stream 316 can be a (e.g., time-ordered) collection of workspace messages (e.g., real-time or near real-time chat messages) generated by members of a workspace, as described above.

At step 1504, the server device can receive a message for the message stream. For example, server device 230 can receive a new workspace message generated by a member of the workspace.

At step 1506, the server device can determine that the message mentions an external user. For example, an external user is any user who is not a member of the workspace (e.g., not an authorized user of the workspace shared folder). The server device can determine that an external user is mentioned in the message by analyzing text in the message for a prefix that identifies a mentioned user. For example, the prefix can be a single character or symbol (e.g., @). The prefix can be multiple characters or symbols (e.g., "at:", "for:", etc.). Once the server device finds the prefix, the server device can compare the string following the prefix to identifiers of workspace members. If the string does not match any workspace members, the server device can determine that the mentioned user is an external user.

At step 1508, the server device can obtain contact information for the external user. For example, the server device can request contact information from the client device of the workspace member who generated the workspace message that contains the mention of the external user. The client device can prompt the workspace member for contact information (e.g., telephone number, email address, etc.) of the external user. The client device can search a contacts database stored on the client device to obtain the contact information for the external user. In some implementations, the server device can store a contacts database in a workspace member's account and search the contacts database to determine contact information for the external user.

At step 1510, the server device can send the message that mentions the external user to the external user according to a communication mechanism corresponding to the contact information obtained for the external user. For example, if the contact information for the external user is a telephone number, the server device can send the workspace message (e.g., the text portion of the message) to the external user using text messaging (e.g., short message service messaging). If the contact information for the external user is an email address, the server device can send the workspace message to the external user using email.

In some implementations, the external user can respond to the workspace message using the same communication mechanism by which the external user received the workspace message. For example, if the external user receives an email message, the external user can reply using email. If the external user receives a text message, the external user can reply by text message. When the server device receives the email or text message reply, the server device can generate a new workspace message that contains the reply and post the new workspace message to the message stream as a reply to the message in which the external user was mentioned.

Figure 16:
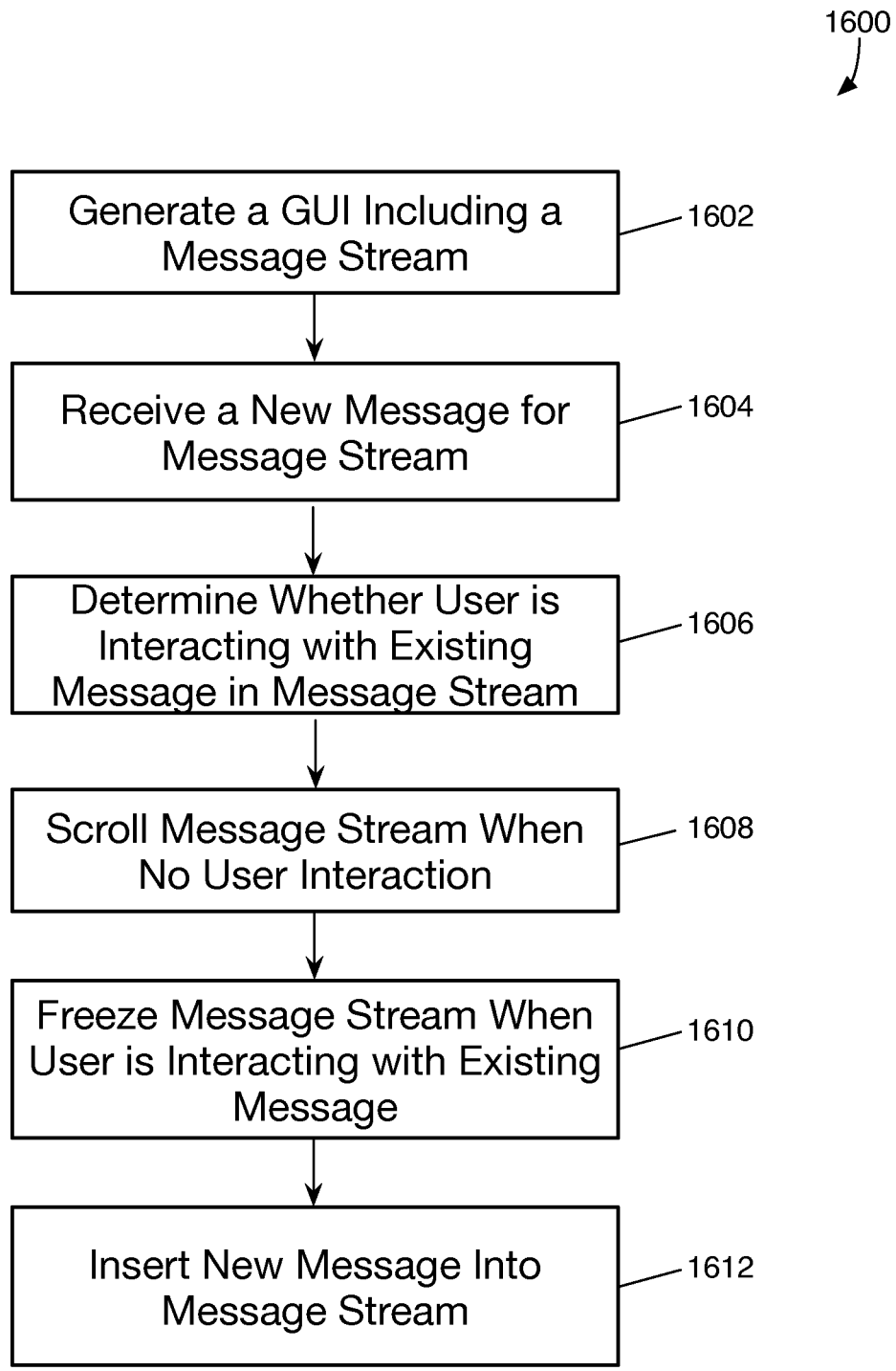
FIG. 16 is a flow diagram of an example process 1600 for presenting chat and threaded conversations in the same graphical user interface.

FIG. 16 is a flow diagram of an example process 1600 for presenting chat and threaded conversations in the same graphical user interface. At step 1602, a client device can generate a workspace graphical user interface that includes a message stream. For example, the client device can generate WS GUI 300 including message stream 316.

At step 1604, the client device can receive a new message for the message stream. For example, a workspace member can generate a new workspace message as described above with reference to FIG. 3. At this point, the new message can be received by the client device but not yet displayed or inserted into the message stream.

At step 1606, the client device can determine whether a user is interacting with an existing message in the message stream. For example, client device $102_i$ can determine the position of an input cursor or pointer over WS GUI 300. When the cursor is located over one of the messages displayed on WS GUI 300, then client device $102_i$ can determine that the user is interacting with an existing message. When the user is providing textual input in response to an existing message (e.g., providing input to text input element 332), then client device $102_i$ can determine that the user is interacting with an existing message. When the user is providing any other input (e.g., a click, touch, swipe, etc.) with respect to an existing message in message stream 316 (e.g., selecting like element 334, selecting reply element 330), then client device $102_i$ can determine that the user is interacting with an existing message in message stream 316. When the user is not providing input to one of the messages displayed in message stream 316, then client device $102_i$ can determine that the user is not interacting with an existing message in message stream 316.

At step 1608, the client device can scroll the message stream when the user is not interacting with an existing message in the message stream. For example, when client device $102_i$ determines that the user is not interacting with an existing message, client device $102_i$ can scroll the message stream to make room for the new message on WS GUI 300 and insert the new message into the message stream, as described above. For example, if client device $102_i$ scrolls the message stream in an upward direction, the new message can be inserted at the bottom of the message stream. If client device $102_i$ scrolls the message stream in a downward direction, the new message can be inserted at the top of the message stream. The scrolling behavior can be the default behavior for adding a new message to the message stream when the new message is received.

At step 1610, the client device can freeze the message stream when the user is interacting with an existing message in the message stream. For example, client device $102_i$ can freeze the message stream by ceasing the scrolling behavior in response to receiving the new message. While the user is interacting with an existing message, client device $102_i$ will not scroll the message stream to make room for the new message.

At step 1612, the client device can insert the new message into the message stream. For example, once the user stops interacting with the existing message, client device $102_i$ can resume the scrolling behavior, insert the new message into the message stream and display the new message on WS GUI 300.

17A and FIG. 17B show example possible system embodiments. The more appropriate embodiment will be apparent to those of ordinary skill in the art when practicing the present technology. Persons of ordinary skill in the art will also readily appreciate that other system embodiments are possible.

FIG. 17A illustrates a conventional system bus computing system architecture 1700 wherein the components of the system are in electrical communication with each other using a bus 1705. Example system 1700 includes a processing unit (CPU or processor) 1710 and a system bus 1705 that couples various system components including the system memory 1715, such as read only memory (ROM) 1720 and random access memory (RAM) 1725, to the processor 1710. The system 1700 can include a cache of high-speed memory connected directly with, in close proximity to, or integrated as part of the processor 1710. The system 1700 can copy data from the memory 1715 and/or the storage device 1730 to the cache 1712 for quick access by the processor 1710. In this way, the cache can provide a performance boost that avoids processor 1710 delays while waiting for data. These and other modules can control or be configured to control the processor 1710 to perform various actions. Other system memory 1715 may be available for use as well. The memory 1715 can include multiple different types of memory with different performance characteristics. The processor 1710 can include any general purpose processor and a hardware module or software module, such as module 1 1732, module 2 1734, and module 3 1736 stored in storage device 1730, configured to control the processor 1710 as well as a special-purpose processor where software instructions are incorporated into the actual processor design. The processor 1710 may essentially be a completely self-contained computing system, containing multiple cores or processors, a bus, memory controller, cache, etc. A multi-core processor may be symmetric or asymmetric.

To enable user interaction with the computing device 1700, an input device 1745 can represent any number of input mechanisms, such as a microphone for speech, a touch-sensitive screen for gesture or graphical input, keyboard, mouse, motion input, speech and so forth. An output device 1735 can also be one or more of a number of output mechanisms known to those of skill in the art. In some instances, multimodal systems can enable a user to provide multiple types of input to communicate with the computing device 1700. The communications interface 1740 can generally govern and manage the user input and system output. There is no restriction on operating on any particular hardware arrangement and therefore the basic features here may easily be substituted for improved hardware or firmware arrangements as they are developed.

Storage device 1730 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1725, read only memory (ROM) 1720, and hybrids thereof.

The storage device 1730 can include software modules 1732, 1734, and 1736 for controlling the processor 1710. Other hardware or software modules are contemplated. The storage device 1730 can be connected to the system bus 1705. In one aspect, a hardware module that performs a particular function can include the software component stored in a computer-readable medium in connection with the necessary hardware components, such as the processor 1710, bus 1705, display 1735, and so forth, to carry out the function.

FIG. 17B illustrates a computer system 1750 having a chipset architecture that can be used in executing the described method and generating and displaying a graphical user interface (GUI). Computer system 1750 is an example of computer hardware, software, and firmware that can be used to implement the disclosed technology. System 1750 can include a processor 1755, representative of any number of physically and/or logically distinct resources capable of executing software, firmware, and hardware configured to perform identified computations. Processor 1755 can communicate with a chipset 1760 that can control input to and output from processor 1755. In this example, chipset 1760 outputs information to output 1765, such as a display, and can read and write information to storage device 1770, which can include magnetic media, and solid state media, for example. Chipset 1760 can also read data from and write data to RAM 1775. A bridge 1780 for interfacing with a variety of user interface components 1785 can be provided for interfacing with chipset 1760. Such user interface components 1785 can include a keyboard, a microphone, touch detection and processing circuitry, a pointing device, such as a mouse, and so on. In general, inputs to system 1750 can come from any of a variety of sources, machine generated and/or human generated.

Chipset 1760 can also interface with one or more communication interfaces 1790 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1755 analyzing data stored in storage 1770 or 1775. Further, the machine can receive inputs from a user through user interface components 1785 and execute appropriate functions, such as browsing functions by interpreting these inputs using processor 1755.

It can be appreciated that example systems 1700 and 1750 can have more than one processor 1710 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:
1. A method comprising:
   generating, by a content management system, a workspace graphical user interface representing a shared folder backed workspace that provides an integrated environment for manipulating content items in the shared folder and communicating with the authorized users of the shared folder, the workspace interface including representations of content items stored in the shared folder and a message stream that includes messages generated by the authorized users of the shared folder;

assigning a workspace email address to the shared folder;

obtaining, by the content management system, an email message addressed to the workspace email address from an email service of an authorized user of the workspace;

generating, by the content management system, a new workspace message based on the email message addressed to the workspace email address; and posting the new workspace message in the message stream, wherein the new workspace message is available to each authorized user of the shared folder in the message stream.

2. The method of claim 1, wherein the message stream is a chat message stream.

3. The method of claim 1, further comprising:
receiving a second workspace message; and
in response to receiving the second workspace message, generating a second email message containing at least a portion of the second workspace message; and
sending the second email to the authorized users of the shared folder.

4. The method of claim 1, wherein the workspace email address is a mailing list email address and wherein each of the authorized users are subscribers to the mailing list email address.

5. The method of claim 1, further comprising:
obtaining a plurality of email messages corresponding to an email thread associated with the workspace email address; and
generating a workspace message thread in the message stream corresponding to the email thread.

6. The method of claim 5, wherein each of the plurality of email messages are addressed to the workspace email address or addressed from the workspace email address.

7. The method of claim 1, wherein obtaining an email message addressed to the workspace email address includes obtaining an email message that was generated prior to assigning the workspace email address to the shared folder.

8. A non-transitory computer-readable medium including one or more sequences of instructions that, when executed by one or more processors, cause:
generating, by a content management system, a workspace graphical user interface representing a shared folder backed workspace that provides an integrated environment for manipulating content items in the shared folder and communicating with the authorized users of the shared folder, the workspace interface including representations of content items stored in the shared folder and a message stream that includes messages generated by the authorized users of the shared folder;
obtaining, by the content management system, an email message from an email service of an authorized user of the workspace, the email message associated with a workspace email address corresponding to the shared folder; and
generating, by the content management system, a new workspace message based on the email message addressed to the workspace email address; and
posting the new workspace message in the message stream, wherein the new workspace message is available to each authorized user of the shared folder in the message stream.

9. The non-transitory computer-readable medium of claim 8, wherein the message stream is a chat message stream.

10. The non-transitory computer-readable medium of claim 8, wherein the instructions cause:
receiving a second workspace message; and
in response to receiving the second workspace message, generating a second email message containing at least a portion of the second workspace message; and sending the second email to the authorized users of the shared folder.

11. The non-transitory computer-readable medium of claim 8, wherein the workspace email address is a mailing list email address and wherein each of the authorized users are subscribers to the mailing list email address.

12. The non-transitory computer-readable medium of claim 8, wherein the instructions cause:
obtaining a plurality of email messages corresponding to an email thread associated with the workspace email address; and
generating a workspace message thread in the message stream corresponding to the email thread.

13. The non-transitory computer-readable medium of claim 12, wherein each of the plurality of email messages are addressed to the workspace email address or addressed from the workspace email address.

14. The non-transitory computer-readable medium of claim 8, wherein the instructions that cause obtaining an email message addressed to the workspace email address include instructions that cause obtaining an email message that was generated prior to associating the workspace email address to the shared folder.

15. A content management system comprising:
one or more processors; and
a computer-readable medium including one or more sequences of instructions that, when executed by the one or more processors, cause:
generating, by a content management system, a workspace graphical user interface representing a shared folder backed workspace that provides an integrated environment for manipulating content items in the shared folder and communicating with the authorized users of the shared folder, the workspace interface including representations of content items stored in the shared folder and a message stream that includes messages generated by the authorized users of the shared folder;
obtaining, by the content management system, an email message from an email service of an authorized user of the workspace, the email message associated with a workspace email address corresponding to the online shared folder; and
generating, by the content management system, a new workspace message based on the email message addressed to the workspace email address; and
posting the new workspace message in the message stream, wherein the new workspace message is available to each authorized user of the shared folder in the message stream.

16. The system of claim 15, wherein the message stream is a chat message stream.

17. The system of claim 15, wherein the instructions cause:
receiving a second workspace message; and in response to receiving the second workspace message, generating a second email message containing at least a portion of the second workspace message; and sending the second email to the authorized users of the shared folder.

18. The system of claim 15, wherein the workspace email address is a mailing list email address and wherein each of the authorized users are subscribers to the mailing list email address.

19. The system of claim 15, wherein the instructions cause:

obtaining a plurality of email messages corresponding to an email thread associated with the workspace email address; and generating a workspace message thread in the message stream corresponding to the email thread.

20. The system of claim 19, wherein each of the plurality of email messages are addressed to the workspace email address or addressed from the workspace email address.

21. The system of claim 15, wherein the instructions that cause obtaining an email message addressed to the workspace email address include instructions that cause obtaining an email message that was generated prior to associating the workspace email address to the shared folder.

\* \* \* \* \*